US010692312B1

(12) United States Patent
Niranjayan et al.

(10) Patent No.: US 10,692,312 B1
(45) Date of Patent: Jun. 23, 2020

(54) USER AUTHENTICATION WITH PORTABLE DEVICE AND SMART FLOOR

(71) Applicant: AMAZON TECHNOLOGIES, INC., Seattle, WA (US)

(72) Inventors: Somasundaram Niranjayan, Issaquah, WA (US); Nikolai Orlov, Toronto (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/348,831

(22) Filed: Nov. 10, 2016

(51) Int. Cl.
*G05B 19/00* (2006.01)
*G07C 9/00* (2020.01)

(52) U.S. Cl.
CPC ..... *G07C 9/00071* (2013.01); *G07C 2209/02* (2013.01)

(58) Field of Classification Search
CPC ........................ G07C 9/00071; G07C 2209/02
USPC ........................................................ 340/5.52
See application file for complete search history.

(56) References Cited

U.S. PATENT DOCUMENTS

| | | | | |
|---|---|---|---|---|
| 7,225,980 | B2 | 6/2007 | Ku et al. | |
| 7,911,342 | B2 * | 3/2011 | Sekine | G07C 9/00309 340/572.1 |
| 7,949,568 | B2 | 5/2011 | Fano et al. | |
| 8,009,864 | B2 | 8/2011 | Linaker et al. | |
| 8,189,855 | B2 | 5/2012 | Opalach et al. | |
| 8,355,992 | B1 * | 1/2013 | Haugh | G07G 3/006 705/64 |
| 8,593,672 | B2 * | 11/2013 | Aoyama | G06F 21/34 358/1.13 |
| 8,630,924 | B2 | 1/2014 | Groenevelt et al. | |
| 9,235,928 | B2 | 1/2016 | Medioni et al. | |
| 9,473,747 | B2 | 10/2016 | Kobres et al. | |
| 2003/0177102 | A1 * | 9/2003 | Robinson | G06Q 20/04 705/75 |
| 2004/0078340 | A1 * | 4/2004 | Evans | G06Q 20/10 705/64 |
| 2006/0237427 | A1 * | 10/2006 | Logan | E05B 47/0002 219/401 |

(Continued)

OTHER PUBLICATIONS

Asthana, et al., “An indoor wireless system for personalized shopping assistance”, CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

Dietz, et al., “DiamondTouch: A Multi-User Touch Technology”, Mitsubishi Electric Research Laboratories. TR2003-125. Oct. 2003. Retrieved from Internet: <<URL: http://www.merl.com/publications/docs/TR2003-125.pdf.>>.

(Continued)

*Primary Examiner* — Zhen Y Wu
(74) *Attorney, Agent, or Firm* — Lindauer Law, PLLC

(57) ABSTRACT

A user obtains authentication credentials using a portable device, such as a smart phone. While standing on a smart floor in a facility, the portable device transmits the authentication credentials to the smart floor. The body of the user electromagnetically couples to electrodes in a touch sensor of the portable device and one or more antennas of the smart floor, acting as a signal path for signals between the mobile device and the smart floor. For example, one or more of the voltage applied to the electrodes, timing of when voltage is applied, and so forth, may be used to produce a particular electromagnetic signal that conveys the authentication credentials. The authenticated user may now be tracked in the facility using the smart floor.

21 Claims, 12 Drawing Sheets

(56) References Cited

U.S. PATENT DOCUMENTS

| | | | | |
|---|---|---|---|---|
| 2007/0288319 | A1* | 12/2007 | Robinson | G06Q 30/02 705/14.25 |
| 2008/0022089 | A1* | 1/2008 | Leedom | H04L 63/068 713/156 |
| 2009/0171851 | A1* | 7/2009 | Beenau | G06K 9/00 705/72 |
| 2010/0090813 | A1* | 4/2010 | Je | G06F 3/016 340/407.2 |
| 2010/0277763 | A1* | 11/2010 | Aoyama | G06F 21/34 358/1.15 |
| 2010/0289772 | A1* | 11/2010 | Miller | G06F 3/0421 345/175 |
| 2010/0323762 | A1* | 12/2010 | Sindhu | G06F 1/1613 455/566 |
| 2011/0011936 | A1 | 1/2011 | Morandi et al. | |
| 2011/0234545 | A1* | 9/2011 | Tanaka | G06F 3/0416 345/177 |
| 2012/0284132 | A1 | 11/2012 | Kim et al. | |
| 2013/0130725 | A1* | 5/2013 | Forutanpour | G01C 21/165 455/456.6 |
| 2013/0284806 | A1* | 10/2013 | Margalit | G06Q 30/06 235/382 |
| 2014/0168121 | A1* | 6/2014 | Chou | G06K 9/00013 345/173 |
| 2015/0071502 | A1* | 3/2015 | Breznicky | G06K 9/00885 382/115 |
| 2015/0086107 | A1 | 3/2015 | Dedeoglu et al. | |
| 2015/0347739 | A1* | 12/2015 | Matsushima | G06F 21/34 726/20 |
| 2016/0127900 | A1* | 5/2016 | Archibald | H04W 12/06 726/7 |
| 2016/0274398 | A1* | 9/2016 | Hirakata | G06F 3/0416 |
| 2017/0124371 | A1* | 5/2017 | Vincent | G06K 9/0002 |

OTHER PUBLICATIONS

Fischer, Dirk, "Capacitive Touch Sensors. Application Fields, technology overview and implementation example", Fujitsu Microelectronics Europe GmbH. V4, Jan. 12, 2010. Retrieved from Internet: <<URL: http://www.fujitsu.com/downloads/MICRO/fme/articles/fujitsu-whitepaper-capacitive-touch-sensors.pdf>>.

Hasegawa, et al., "Human Body Equivalent Phantom for Analyzing of Surface and Space Propagation in MHz-Band Signal Transmission", Department of Electronics, Kyoto Institute of Technology. Retrievable from Internet: <<http://ieeexplore.ieee.org/document/7481823/>>.

Kalnikaite, et al., "How to Nudge in Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

O'Connor, Todd, "mTouch™ Projected Capacitive Touch Screen Sensing Theory of Operation", Microchip Technology Inc. TB3064. 2010. Retrieved from Internet: <<URL: https://www.microchip.com/stellent/groups/techpub_sg/documents/devicedoc/en550192.pdf>>.

Pop, Cristian, "Introduction to the BodyCom Technology", AN1391, DS01391A, Microchip Technology, Inc., May 2, 2011.

Valtonen, Miika, "Technologies for Smart Environments: Capacitive User Tracking and Proactive Fuzzy Control", Tampere University of Technology. Publication 1044. 2012. Retrieved from Internet: <<http://dspace.cc.tut.fi/dpub/bitstream/handle/123456789/21002/valtonen.pdf?sequence=3&isAllowed=y>>.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

* cited by examiner

USER AUTHENTICATION WITH PORTABLE DEVICE AND SMART FLOOR

BACKGROUND

In various facilities, it may be worthwhile to determine an identity of a particular user. For example, an operator of a hospital, warehouse, airplane terminal, and so forth, may want to identify who is on the premises. The user may be identified at a point of entry or exit, or at another point within the facility.

Authenticating the identity of a user who is present at a particular facility or location in the facility may pose various challenges. For example, a user may be required to check in at a front desk, swipe a card at a gate, and so forth, prior to entry. This arrangement uses up floor space for an entry area, requires obtrusive equipment, and is time consuming. For example, if a crowd of users enters the facility in a short span of time, some of those users are delayed entry while waiting for others to be processed. The existing systems thus suffer various impediments to the smooth flow of users while still providing robust authentication.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
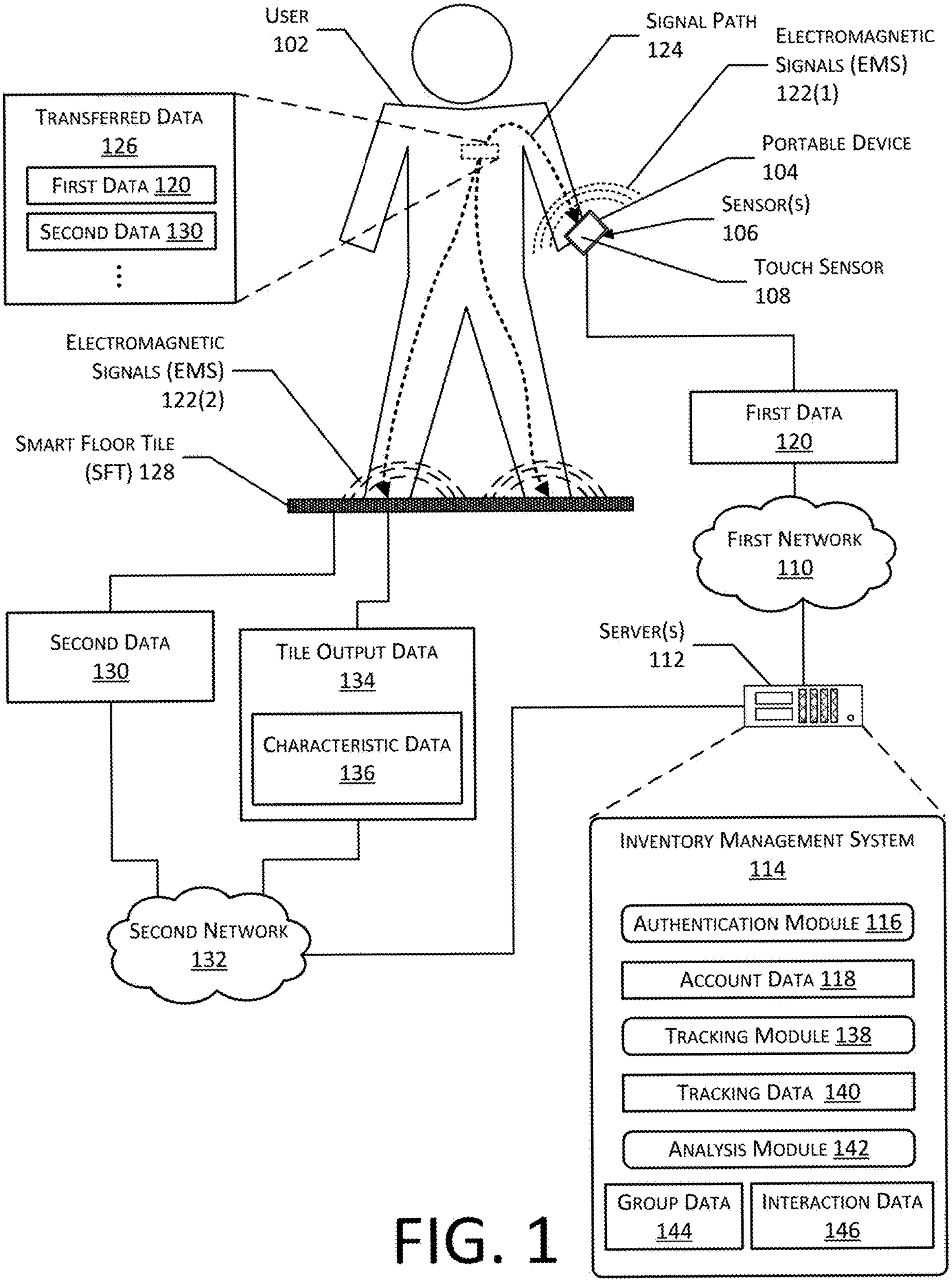
FIG. 1 illustrates a system that uses electromagnetic signals between a portable device and a smart floor tile to authenticate a user, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Described in this disclosure are systems and techniques for authenticating a user that is present at a facility. The facility may include a residence, workplace, public facility, and so forth. For example, the facility may comprise a materials handling facility that includes, or has access to, an inventory management system. The inventory management system may be configured to maintain information about items, users, condition of the facility, and so forth. Continuing the example, the inventory management system may maintain data indicative of a number of items at a particular fixture, what items a particular user is ordered to pick, how many items have been picked or placed at the fixture, requests for assistance, environmental status of the facility, and so forth.

In some situations, it may be worthwhile to authenticate the identity of a particular user as being present at the facility at a particular time. For example, an operator of a warehouse may want to know who has entered the facility and when.

The floor of the facility may comprise a plurality of smart floor tiles (SFTs). The SFTs may include transmitters that generate electromagnetic signals (EMS), receivers to detect EMS, or both such as in a transceiver. In some implementations, these signals may be low frequency, in that the carrier has a frequency of less than or equal to 30 MHz. The SFTs may also include sensors such as touch or pressure sensors that provide object data indicative of an object such as a foot or wheel that is in contact with the smart floor tile.

The user is equipped with a portable device, such as a smart phone, wearable computing device, and so forth. The portable device is able to send, receive, or both send and receive EMS that may be received from or transmitted to the smart floor tiles. The portable device may generate the EMS using hardware such as a touch sensor, display device, and so forth. For example, touch sensor control circuitry may be directed to scan particular junctions in a touch sensor array at a greater frequency, increase an amplitude of the scan signal, and so forth. In another example, the display device may be directed to present particular images to produce the EMS. In other implementations, the portable device may include a dedicated EMS transmitter, EMS receiver, or both.

An object may electromagnetically couple to a proximate antenna or electrode. Once electromagnetically coupled, the object may act as a propagation path for the EMS. For example, when a user is standing on an SFT, their foot electromagnetically couples to an antenna in the SFT. Continuing the example, when the user is touching a touch screen, their finger electromagnetically couples to one or more of the electrodes in the junction of the touch sensor. As a result, the body of the user provides a signal path between the portable device and the SFT. This signal path may be used to communicate data which may then be used to authenticate the user.

Authentication of the user may utilize the communication between the portable device and the SFT by way of the EMS and the signal path provided by the body of the user to authenticate the user. In one implementation, the portable device may include a fingerprint scanner which is used to obtain biometric data such as fingerprint data. The fingerprint data may be included in a request for authentication data. The portable device may use a network connection and send this authentication request data to a server. The server may then process the authentication request data and determine that the information about the fingerprint indeed corresponds to a particular user account, and return authentication data. For example, the authentication data may include a token that comprises a value that expires after a predetermined time or a particular event. The portable device receives this authentication data and may then generate an EMS that conveys or otherwise represents the authentication data, such as the value of the token. The authentication data is transmitted from the portable device to the SFT by way of the signal path provided by contact with both. For example, while the user's finger is in contact with the touch sensor, the authentication data may be transmitted. The SFT receives the authentication data and may then pass that authentication data back to the server. The server may then compare the authentication data that it provided to the portable device with that obtained from the SFT. If the two match, the user is deemed to be authenticated as present at the SFT and is then associated with the user account that corresponds to the authentication data. Other implementations may also be realized. For example, the portable device may send to the SFT information indicative of the biometric data, such as a hash of the fingerprint data, which is then sent along to the server for comparison.

Operation of the facility may be facilitated by using one or more sensors to acquire information about interactions in the facility. By authenticating the user, particular interactions may be associated with particular users. The inventory management system may process the sensor data from the one or more sensors to determine tracking data, interaction data, and so forth. The tracking data provides information about the location of a user within the facility, their path through the facility, and so forth. The interaction data is indicative of an action such as picking or placing an item at a particular location on the fixture, touching an item at a particular location on the fixture, presence of the user at the fixture without touching the item, and so forth. For example, the inventory management system may use the sensor data to generate tracking data and interaction data that determines a type of item a user picked from a particular fixture.

A fixture may include one or more item stowage areas such as shelves, hangers, and so forth, that hold or otherwise support a type of item. The fixture may be arranged into sections, such as lanes on a shelf. For example, a shelf may have three lanes, with each lane holding a different type of item. Items may be added to (placed) or removed (picked) from the fixture, moved from one fixture to another, and so forth. By using sensors or other devices at the fixtures, the particular user account of the user may be billed for particular interactions, such as a pick of a particular item.

By using the techniques described herein, operation of the facility may be improved. Details about the presence and movement of particular users in the facility, the interactions between the particular users and items in the facility, and so forth, may be quickly and accurately determined. For example, as items are picked, placed, and so forth, information such as inventory levels based on changes in the count of items at the fixtures may be readily and more accurately determined. As a result, the inventory management system may be able to quickly track what item a user has interacted with, maintain up-to-date inventory information, and so forth. Tracking of users may be facilitated, allowing for enhanced services to the users of the facility, such as making the facility respond to the presence of a user. For example, as an authorized user approaches a fixture holding items that is locked, the fixture may unlock to provide access.

The use of the communication between the portable device and the SFT by way of the EMS allows for highly localized communications and assurance that a particular user is in the facility. Given that the SFT is known to be within the facility, and even at a particular location within the facility, communication using the SFT provides a high assurance as to the physical presence of the user and their portable device. By using the portable devices of the users to provide the input or other information involved in authenticating the user, bottlenecks such as a check-in desk or limited number of physical entry gates with card readers are further avoided.

Illustrative System

FIG. 1 illustrates a system 100 using electromagnetic signals (EMS) between a portable device and a smart floor tile (SFT) to authenticate a user, according to some implementations.

A user 102 has a portable device 104. The portable device 104 may include a smart phone, wearable device, tablet computer, and so forth. The portable device 104 may include one or more sensors 106, such as a touch sensor 108. The touch sensor 108 may comprise a capacitive touch sensor, a resistive touch sensor, and so forth. The portable device 104 may include a communication interface that allows the portable device 104 to establish communication with the first network 110. For example, the communication interface may comprise a Wi-Fi or Bluetooth interface that allows connection to an access point or another computing device. The first network 110 may comprise a local area network, wide area network, and so forth. The portable device 104 may be able to establish communication with a server 112 using the first network 110. The server 112 may include an inventory management system 114.

The inventory management system 114 may include an authentication module 116. The authentication module 116 may be configured to determine a particular user account, as stored in account data 118, that is associated with a physical presence of the user 102 at the facility. For example, the authentication module 116 may compare authentication data that is obtained from different devices to determine if a user 102 associated with a particular user account is present at a particular location. Operation of the authentication module 116 is discussed in more detail below.

The portable device 104 may generate first data 120 or receive the first data 120 from another device, such as the server 112. For example, the first data 120 may comprise authentication data generated by the portable device 104, by the authentication module 116, and so forth.

The portable device 104 may transmit or receive electromagnetic signals (EMS) 122 propagated along a signal path 124. These EMS 122 may be propagated along a signal path 124 that may include the body of a user 102 or other objects. For example, the signal path 124 of the EMS 122 may include the point of contact of the user 102 with the portable device 104, the user's 102 body, and another device such as a smart floor tile (SFT) 128. In some implementations, the EMS 122 may have a carrier frequency of between 20 kilohertz and 15 megahertz. The EMS 122 may be used to communicate transferred data 126, such as the first data 120.

The facility includes a floor that may comprise one or more SFTs 128. In some implementations, the SFTs 128 may be arranged into a group designated as a cluster. The floor may include a plurality of clusters. The SFT 128 may include one or more of a transmitter to transmit the EMS 122, a receiver to receive the EMS 122, or both a transmitter and a receiver.

The SFT 128 may generate second data 130 or receive the second data 130 from another device, such as the portable device 104, the server 112, and so forth. For example, the second data 130 may comprise authentication data generated by the authentication module 116. The transferred data 126 may also include the second data 130.

The SFT 128 may include a communication interface that allows the SFT 128 to establish communication with a second network 132. For example, the communication interface may comprise a Controller Area Network (CAN) interface that connects to the second network 132. The server 112 may also be in communication with the second network 132. For example, the SFT 128 may be able to send or receive second data 130 to and from the server 112.

One or more processors of the SFT 128 may generate tile output data 134. The tile output data 134 may include characteristic data 136. The characteristic data 136 may provide information about the EMS 122 received by the SFT 128. For example, the characteristic data 136 may be indicative of a frequency of a received signal, signal strength of the received signal, phase of the received signal, and so forth. In some implementations, the characteristic data 136 may be used to determine the location of the user 102 within the facility.

During operation of the system, the transferred data 126 may be used to authenticate the user 102. In one implementation, the sensors 106 may include biometric sensors such as fingerprint readers, cameras, and so forth. The portable device 104 may execute an application that communicates with the server 112. The portable device 104 may send information based on the sensor data obtained from the one or more sensors 106 to the server 112. For example, fingerprint data representative of the fingerprint of the user 102 is obtained from a fingerprint reader may be hashed, encrypted, and so forth. The fingerprint data may be sent to the server 112 for processing by the authentication module 116. The authentication module 116 may determine that the fingerprint data corresponds to a particular user account specified by the account data 118 and generates authentication data. For example, the authentication data may comprise a token or value. The authentication data is then returned to the portable device 104. In this implementation, the portable device 104 may transmit the first data 120 that includes the authentication data to the SFT 128 using the EMS 122. For example, the EMS 122(1) as transmitted by the portable device 104 conveys the first data 120.

Continuing this implementation, the SFT 128 receives the EMS 122(1), decodes it, and generates second data 130 that is indicative of the authentication data. The SFT 128 may then transmit the second data 130 to the inventory management system 114. The authentication module 116 may then compare the first data 120 with the second data 130 to determine if the authentication data as provided to the portable device 104 matches that which was received by the SFT 128. When the two match, the user 102 associated with the user account may be deemed to be present at the facility. In some implementations, timestamps associated with the data may be compared to determine that the first data 120 and the second data 130 are within a threshold amount of time of one another. For example, the authentication module 116 may discard second data 130 that does not have a timestamp value that is within three seconds of a timestamp value associated with sending the first data 120 to the portable device 104.

In other implementations, other techniques may be used. For example, the SFT 128 may transmit a second EMS 122(2) that conveys the authentication data, while the portable device 104 is used to receive this second EMS 122(2). By using the signal path 124 of the EMS 122 between the portable device 104 and the SFT 128, information may be transmitted between the two with a high degree of assurance that the portable device 104 is located at the SFT 128. By utilizing biometric sensors, there may be a high degree of assurance that the user 102 is present with the portable device 104 which is located at the SFT 128.

The portable device 104, the SFT 128, or both may transmit continuously or periodically. For example, the SFTs 128 may continuously transmit the EMS 122(2) that are indicative of the particular tile or portion thereof.

With the user 102 authenticated, and a particular user account known and associated with that user 102, the inventory management system 114 may be used to provide other information. The inventory management system 114 may include a tracking module 138. The tracking module 138 may use the tile output data 134 or data from other fixtures to generate tracking data 140. The fixture may include shelves, hangers, cubbyholes, and so forth, that are configured to store one or more items. The tracking data 140 may include one or more of information indicative of a user path within the facility, current location, location at a particular time, and so forth. In some implementations, the tracking module 138 may be executed as a tracking system, such as provided by one or more computing devices. In some implementations, the tracking module 138 may use the characteristic data 136 to further distinguish between users 102 or other objects. For example, the user 102, a tote, or other object may include a transmitter that emits a discrete EMS 122 or a receiver that receives the EMS 122 and provides characteristic data 136. In some implementations, the distribution of received EMS 122 signal amplitude with respect to feet (such as greater signal strength at the toe than at the heel) may be used to determine an approximate shape of the foot that is indicative of a particular user 102 or other object to be tracked. This data may be used instead of, or in conjunction with, the characteristic data 136 to generate the tracking data 140.

An analysis module 142 may use the tracking data 140 to generate group data 144. The group data 144 may comprise information that associates a plurality of users 102 as belonging to a common group or having a common affiliation. For example, members of a family within the facility may be deemed to be a group, members of the same picking crew may be members of a group, and so forth. In some implementations, the tile output data 134 may be processed to determine the group data 144. For example, several users 102 may be holding hands or otherwise in physical contact with one another. As a result of this contact, the EMS 122(2) from a first SFT 128(1) may be transferred through those users 102 to the receivers of the SFTs 128 beneath each of the other members of the group. By determining the presence of a plurality of users 102, such as by multiple footprints detected by the sensors within the SFTs 128 that share a common EMS 122 that conveys the same characteristic data 136, group data 144 may be determined.

The analysis module 142 may also generate interaction data 146. The interaction data 146 is indicative of an action such as picking or placing an item at a particular fixture, approaching but not touching an item stowed at the fixture, presence of the user 102 at the fixture, and so forth. For example, the analysis module 142 may use tracking data 140 to determine that a particular user 102 was in front of a particular fixture at a time when that fixture experienced a change in quantity of items stowed therein. Based on this correspondence, a particular user 102 may be associated with that change in quantity, and interaction data 146 indicative of this may be generated.

The analysis module 142 may also use data obtained from one or more sensors 106 or other devices located at or near a fixture to generate the interaction data 146. In one implementation, the fixture may include one or more receivers that are able to receive the EMS 122. As the user 102 comes into contact with the item stowed at the fixture, their body and the item itself provide a signal path 124 for the EMS 122 to be transferred to an antenna located at the fixture. As a result, use of the SFT 128 and the EMS 122 provides the additional benefit of unambiguously identifying an item that the particular user 102 interacted with. The analysis module 142 is configured to generate the interaction data 146 based on inputs including, but not limited to, the tile output data 134, the fixture, and so forth.

In some implementations, the techniques described here may be used to provide for communication between devices. For example, a first portable device 104(1) may exchange transferred data 126 with a second portable device 104(2) using the EMS 122. In another example, the portable device 104 may exchange transferred data 126 with an electronic door lock.

By using the devices and the techniques described in this disclosure, the user 102 may be authenticated and affirmatively identified with respect to a particular user account or other identifying information. With the identity of the user 102 assured, the inventory management system 114 or other systems are able to correctly associate a particular interaction with that user 102.

Figure 2:
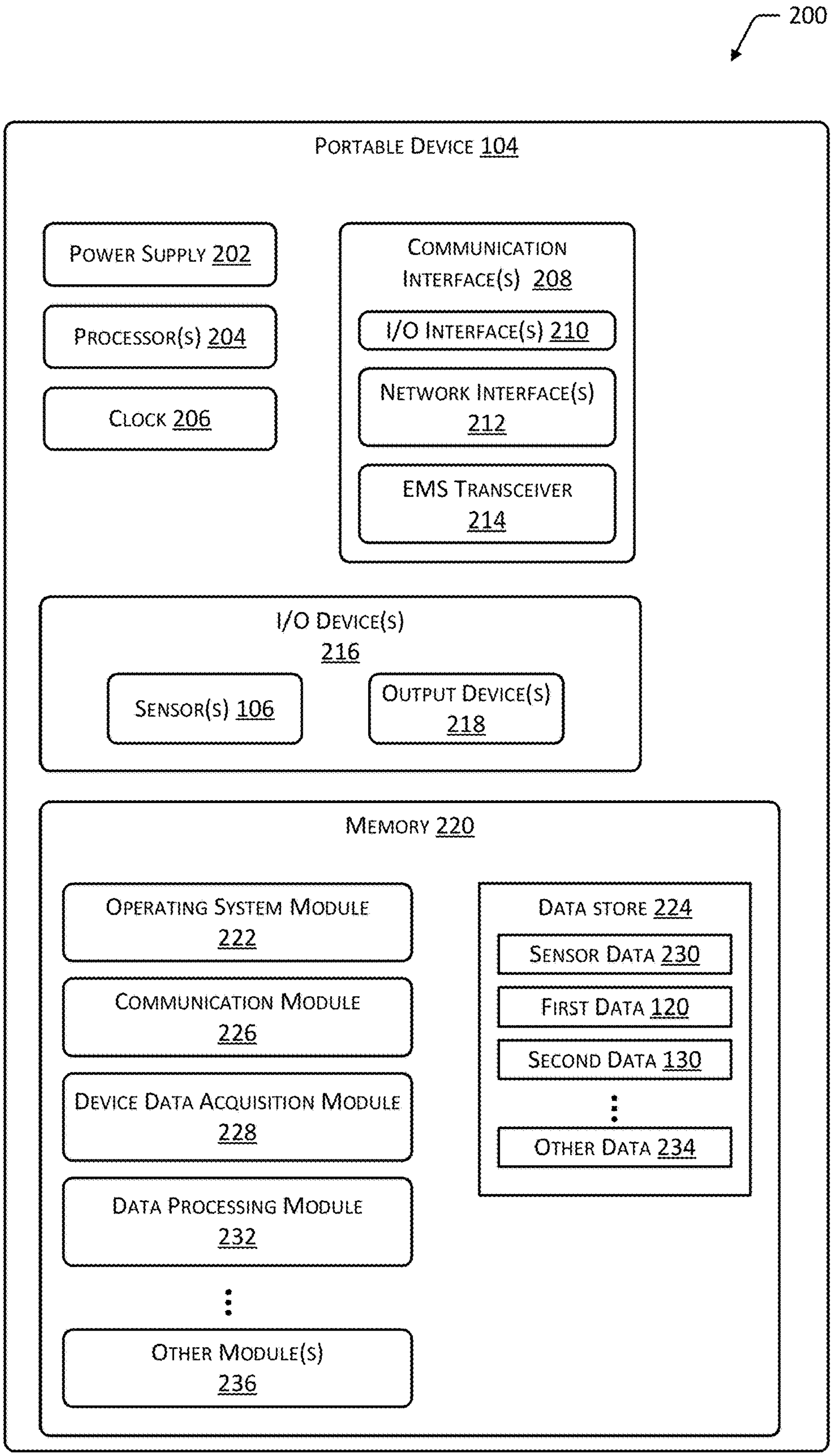
FIG. 2 illustrates a block diagram of a portable device, according to some implementations.

FIG. 2 illustrates a block diagram 200 of the portable device 104, according to some implementations. The portable device 104 may comprise one or more of a smart phone, wearable computer, fitness tracker, tablet computer, and so forth.

The portable device 104 may include one or more power supplies 202. The one or more power supplies 202 may comprise batteries, capacitors, fuel cells, photovoltaic cells, wireless power receivers, conductive couplings suitable for attachment to an external power source such as provided by an electric utility, and so forth. The portable device 104 may include one or more hardware processors 204 (processors) configured to execute one or more stored instructions. The processors 204 may comprise one or more cores. One or more clocks 206 may provide information indicative of date, time, ticks, and so forth. For example, the processor 204 may use data from the clock 206 to associate a particular interaction with a particular point in time.

The portable device 104 may include one or more communication interfaces 208 such as I/O interfaces 210, network interfaces 212, and so forth. In some implementations, the communication interfaces 208 may include an EMS transmitter, an EMS receiver, or an EMS transceiver 214. The communication interfaces 208 enable the portable device 104, or components thereof, to communicate with other devices or components.

The communication interfaces 208 may include one or more of the I/O interfaces 210. The I/O interfaces 210 may comprise I2C, SPI, USB, RS-232, and so forth. The I/O interface(s) 210 may couple to one or more I/O devices 216. The I/O devices 216 may include input devices such as one or more sensors 106, a touch sensor 108, keyboard, mouse, scanner, and so forth. The I/O devices 216 may also include output devices 218 such as one or more of a display device, audio speakers, and so forth. In some embodiments, the I/O devices 216 may be physically incorporated with the portable device 104 or may be externally placed.

The network interfaces 212 may be configured to provide communications between the portable device 104, routers, access points, and so forth. The network interfaces 212 may include devices configured to couple to personal area networks (PANs), local area networks (LANs), wireless local area networks (WLANS), wide area networks (WANs), wireless cellular data network (WCDN), and so forth. For example, the WCDN interface may allow connection to a 3G, 4G, LTE, or other cellular data networks.

The portable device 104 may also include one or more busses or other internal communications hardware or software that allow for the transfer of data between the various modules and components of the portable device 104.

As shown in FIG. 2, the portable device 104 includes one or more memories 220. The memory 220 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 220 provides storage of computer-readable instructions, data structures, program modules, and other data for the operation of the portable device 104. A few example functional modules are shown stored in the memory 220, although the same functionality may alternatively be implemented in hardware, firmware, or as a SoC.

The memory 220 may include at least one operating system (OS) module 222. The OS module 222 is configured to manage hardware resource devices such as the I/O interfaces 210, the I/O devices 216, the communication interfaces 208, and provide various services to applications or modules executing on the processors 204. The OS module 222 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 220 may be a data store 224 and one or more of the following modules. These modules may be executed as foreground applications, background tasks, daemons, and so forth. The data store 224 may use a flat file, database, linked list, tree, executable code, script, or other data structure to store information. In some implementations, the data store 224 or a portion of the data store 224 may be distributed across one or more other devices including the servers 112, network attached storage devices, and so forth.

A communication module 226 may be configured to establish communications with the inventory management system 114, the SFTs 128, or devices associated therewith. The communications may be authenticated, encrypted, and so forth.

The memory 220 may store a device data acquisition module 228. The device data acquisition module 228 may be configured to acquire sensor data 230 from sensors onboard or in communication with the portable device 104. For example, the device data acquisition module 228 may be used to obtain sensor data 230 from the one or more sensors 106 such as a fingerprint reader, iris scanner, and so forth, that generate biometric data about the user 102. In some implementations, the biometric data may be indicative of a behavioral or physical characteristic of the user 102. For example, the way the user 102 types, manipulates a mouse, manipulates the touch sensor 108, moves the portable device 104 around in space, and so forth, may be used to generate metric data.

The data store 224 may be used to store one or more of the sensor data 230, the first data 120, the second data 130, and so forth.

The memory 220 includes a data processing module 232 that may use as input one or more of the sensor data 230, the first data 120, the second data 130, or other data 234. For example, the data processing module 232 may be configured to establish communication with the inventory management system 114 using the communication interfaces 208.

The data processing module 232, the communication module 226, or other modules 236 may be configured to use I/O devices 216 to communicate with the SFT 128. In one implementation, the data processing module 232 may generate instructions or otherwise operate the touch sensor 108 to generate the EMS 122(1). For example, the data processing module 232 may direct the touch sensor 108 to apply voltages at particular times to particular electrodes within the touch sensor 108. The EMS 122 may then be radiated using the particular electrodes. Other techniques may be used to generate EMS 122 using the touch sensor 108. For example, the clock frequency of the touch sensor 108 may be varied to generate the EMS 122. In another example, a local oscillator frequency may be used to generate the EMS 122 during operation of the touch sensor 108. For example, an oscillator may be used to generate an alternating current at radio frequencies, such as between 10 kHz and 15 MHz. This alternating current may be used to provide a time changing voltage to the junctions 308. In some implementations, the local oscillator frequency may be controllable, such that the frequency, phase, amplitude, and so forth, of the output from the local oscillator may be changed to convey data.

In another implementation, the data processing module 232 may process data obtained by the touch sensor 108 to receive data transmitted via an EMS 122. For example, the EMS 122 as propagated along the signal path 124 from the SFT 128 to the portable device 104 may be detected by the touch sensor 108 as touch events. Duration of touch, timestamp of the touch, relative position with respect to the touch sensor 108, number of simultaneous touches, or other data about the touch events may be expressed as touch event data. For example, the sensor data 230 may include touch event data. The data processing module 232 may process the touch event data and determine that 47 touches occurred during 100 milliseconds. These touch events may be deemed to have occurred too quickly to be an actual human interaction, and thus may be processed to decode information conveyed by the touch events.

The data processing module 232 may also provide other functions. For example, the data processing module 232 may authenticate the user 102 using sensor data 230 obtained by the one or more sensors 106 of the portable device 104. For example, the data processing module 232 may obtain fingerprint data from a fingerprint reader. The fingerprint data may be compared with a locally stored value or may be sent using the communication interface 208 to the server 112.

Other modules 236 may also be present in the memory 220. For example, the other modules 236 may include a cryptographic module used to encrypt or decrypt data transmitted using the EMS 122.

Figure 3:
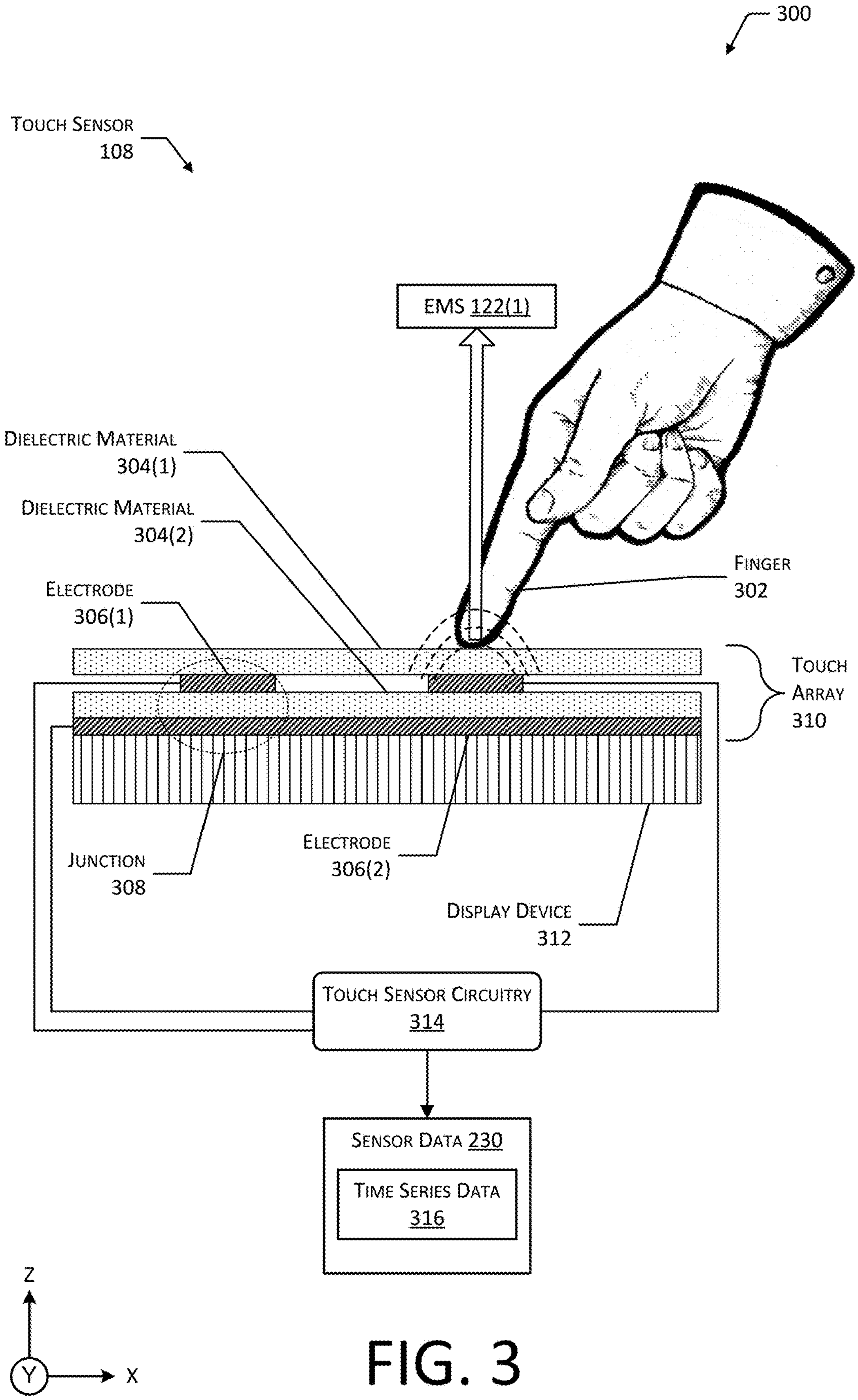
FIG. 3 illustrates a block diagram of a touch sensor on the portable device, according to some implementations.

FIG. 3 illustrates a block diagram 300 of the touch sensor 108 that may be part of the portable device 104, according to some implementations. A finger 302 of the user 102 is in contact with (or proximate to) a portion of the touch sensor 108. The touch sensor 108 may comprise one or more layers of dielectric material 304 that separate one or more electrodes 306. The dielectric material 304 acts as an electrical insulator. The dielectric material 304 may be a solid such as a plastic, a gas such as air, a vacuum, and so forth. As depicted in this figure, the dielectric material 304(1) may comprise glass that provides an uppermost layer of the touch sensor 108. Under the dielectric material 304(1), a first set of one or more electrodes 306(1) are arranged. For example, these electrodes 306(1) may be arranged in columns. Beneath the one or more electrodes 306(1) is dielectric material 304(2). Beneath the dielectric material 304(2), a second set of one or more electrodes 306(2) are arranged. Continuing the example, this second set of electrodes 306(2) may be arranged in rows. Together, the first set of electrodes 306(1) and the second set of electrodes 306(2) produce an array of junctions 308, with each junction 308 comprising the intersection between a particular row and column of electrodes 306. A touch array 310 may comprise the dielectric material 304 and the electrodes 306. In other implementations, the touch array 310 may comprise discrete electrodes 306 or pairs of electrodes 306 forming junctions 308 that act as touch sensitive areas.

The touch array 310 may be at least partially transparent to optical wavelengths of light. For example, the dielectric material 304 may comprise glass or plastic. Likewise, the electrodes 306 may be transparent. For example, the electrodes 306 may comprise indium tin oxide (ITO). In another example, the electrodes 306 may have a small feature size, to minimize impact on the transmission of an image through the touch array 310.

In some implementations, the touch array 310 may be arranged atop a display device 312. For example, the display device 312 may comprise a liquid crystal display, interferometric display, electronic ink display, and so forth. The combination of the display device 312 and touch array 310 may be referred to as a "touchscreen". In some implementations, the display device 312 may itself include a matrix or array of junctions 308, such as those used to change the orientation of liquid crystals, to emit light from a light emitting diode junction, and so forth.

During operation, the finger 302 of the user 102 comes into contact with the dielectric material 304(1). Touch sensor circuitry 314 may be configured to measure one or more electrical characteristics associated with one or more junctions 308. The electrical characteristics may include, but are not limited to, one or more of electrical resistance, electrical capacitance, frequency, or phase. For example, the capacitive touch sensor 108 may measure changes in the electrical capacitance at one or more junctions 308. The touch sensor circuitry 314 may generate sensor data 230. For example, the sensor data 230 may comprise time series data 316. Time series data 316 may be indicative of capacitance at a given junction 308 at particular times. In some implementations, the time series data 316 may comprise a serialized data stream that is emitted by the touch sensor circuitry 314.

The touch sensor circuitry 314 may be configured to interleave use of the electrodes 306. For example, at a first time, the electrodes 306 may be scanned to gather data used to determine a touch. Continuing the example, at a second time, the electrodes 306 may be driven to generate the EMS 122. In some situations, operation of the touch sensor circuitry 314 may be interleaved with operation of other devices, such as the display device 312. Continuing the example, the display device 312 may not be driven during one or more of the first time or the second time to minimize interference between the devices.

In some implementations, the touch sensor 108 may be configured to use a far-field capacitance effect that may comprise measuring the self-capacitance of the electrodes 306, rather than a mutual capacitance. In one implementation, a fixed charge may be provided to one or more of the electrodes 306, and the resultant voltage may be measured between the one or more of the electrodes 306 and the ground.

In other implementations, the touch sensor 108 may be configured to operate in a mutual capacitance mode, surface capacitance mode, and so forth. In mutual capacitance mode, at least two conductive layers are arranged in a stack with a dielectric material 304 between the layers of the touch array 310, such as shown in FIG. 3. The mutual capacitance at points between these layers is measured. When another object touches the outermost conductive layer, the mutual capacitance between the two layers changes, allowing for detection. In surface capacitance mode, voltages are applied to different points of an electrode 306 to produce an electrostatic field. By measuring the changes in current draw (or another electrical characteristic) from the different points at which voltage is applied, a location of an object may be determined.

In another implementation, the touch sensor 108 may measure other electrical characteristics at the junction 308. For example, instead of a second dielectric material 304(2), the first set of electrodes 306(1) and the second set of electrodes 306(2) may be separated by compressible material that exhibits a change in electrical resistance or conductivity responsive to pressure. In this implementation, the touch sensor circuitry 314 may measure the electrical resistance at the junctions 308 in order to generate time series data 316.

The portable device 104 may utilize one or more touch sensors 108 that are in a variety of different form factors and sizes. For example, a touchscreen may include a first touch sensor 108(1), while a fingerprint reader comprises a smaller touch sensor 108(2). When the portable device 104 incorporates more than one touch sensor 108, they may utilize different technologies. For example, the first touch sensor 108(1) may comprise an optical or ultrasonic touch sensor while the second touch sensor 108(2) comprises a capacitive touch sensor. In some implementations, the touch sensor 108 or portion thereof may be configured to acquire fingerprint data. For example, the touch sensor 108 may be configured to scan features of the user's 102 fingerprint.

The touch sensor circuitry 314 may include various devices such as clocks, oscillators, switching electronics to control addressing of the junctions 308, analog-to-digital converters, filters, digital signal processors, and so forth.

It is possible to use the touch sensor 108 to generate EMS 122, to receive EMS 122, or both. When the finger 302 is proximate to a junction 308, it is capacitively coupled to that junction 308. This capacitive coupling produces the change in capacitance that is detected by the touch sensor circuitry 314 and used to generate data indicative of a touch event.

The capacitive coupling may be used to transfer a signal from the junction 308 to the finger 302 and thus along the signal path 124 provided by the body of the user 102. A variety of techniques may be used to produce an EMS 122 using the touch sensor 108. In one implementation, by driving the junction 308 in a particular fashion, such as by applying a voltage across a particular one of the first set of electrodes 306(1) and the second set of electrodes 306(2), an EMS 122 is generated. In other implementations, the EMS 122 may be generated by providing the time-varying output of an oscillator to a particular junction 308. In some implementations, one or more of the first set of electrodes 306(1) and one or more of the second set of electrodes 306(2) may be used to generate the EMS 122. For example, the time varying electrical signal may be applied to all of the first set of electrodes 306(1) and all of the second set of electrodes 306(2). The touch sensor circuitry 314 may be used to drive the touch array 310 to transmit data, such as by driving the junctions 308 in a particular pattern that conveys the first data 120 using on-off-keying (OOK). In other implementations, other modulation or keying techniques may be used by the touch sensor circuitry 314 to generate the EMS 122. For example, the amplitude of the signals used to scan the junctions 308 of the touch sensor 108 may be varied with time. The time between scans of the junctions 308 may be changed. The phase of the scans may be changed. One or more techniques may be used to generate the EMS 122 and convey data, including, but not limited to, pulse code modulation, pulse width modulation, pulse amplitude modulation, phase modulation, pulse position modulation, pulse duration modulation, pulse frequency modulation, and so forth.

In some implementations, the touch sensor circuitry 314 may include programmable devices, such as a field programmable gate array, field programmable object array, erasable programmable logic device, and so forth. By using these programmable devices, functionality of the system may be modified after deployment without requiring a change in the touch sensor 108 hardware.

The touch sensor 108 may also be used to receive the EMS 122 that is propagated along a signal path 124. For example, an EMS 122 that is generated by the SFT 128 may be propagated along a signal path 124 of the body of the user 102 to the finger 302. At the touch array 310, the touch sensor circuitry 314 may generate sensor data 230 responsive to the EMS 122. For example, the EMS 122 may produce at the junction 308 a change in one or more electrical characteristics which may be measured by the touch sensor circuitry 314. The touch sensor circuitry 314 may interpret this change as a touch event. The time series data 316 may be indicative of touch events and particular patterns, or with a particular repetition rate. For example, the EMS 122 as detected by the touch sensor 108 may generate time series data 316 that is indicative of 27 touches per second. This time series data 316 may then be processed by the data processing module 232 to decode the second data 130 that was transmitted by the SFT 128. For example, the second data 130 may be transmitted by the SFT 128 using OOK. The time series data 316 may be processed to look for touch events that correspond to particular patterns, occur within certain windows of time, and so forth.

In some implementations, the display device 312 may be used to generate EMS 122. As described above, the display device 312 may itself have an array of junctions 308. For example, a light emitting diode (LED) display may comprise an array of thousands of picture elements (pixels) that each comprise one or more diode junctions 308. By energizing particular pixels, an image is produced on the LED display. During activation of a particular diode junction 308, an EMS 122 may be omitted. By controlling which pixels are energized, and the time at which they are energized, it is possible to generate an EMS 122 that conveys data. In one implementation, a particular image or sequence of images may be presented by the display device 312 to generate a particular EMS 122. For example, the sequence of images that alternate some number of all-black frames with some number of all-white frames may be used to generate the EMS 122. The EMS 122 may then be capacitively coupled to the finger 302 and thus pass along the signal path 124 to a receiver, such as that in the SFT 128.

In some implementations, the touch array 310 or portion thereof may be used as an antenna for the EMS transceiver 214. For example, the output from the transmitter of the EMS transceiver 214 may be connected to the first set of electrodes 306(1).

The user 102 may be instructed to maintain contact with the touch sensor 108 at a specific time to facilitate transmission of the transferred data 126. For example, the display device 312 may be directed to present an icon or image that directs the user 102 to touch the touch sensor 108. While that icon is being presented, the EMS 122 may be generated and used to transmit the transferred data 126 between the portable device 104 and the SFT 128.

Figure 4:
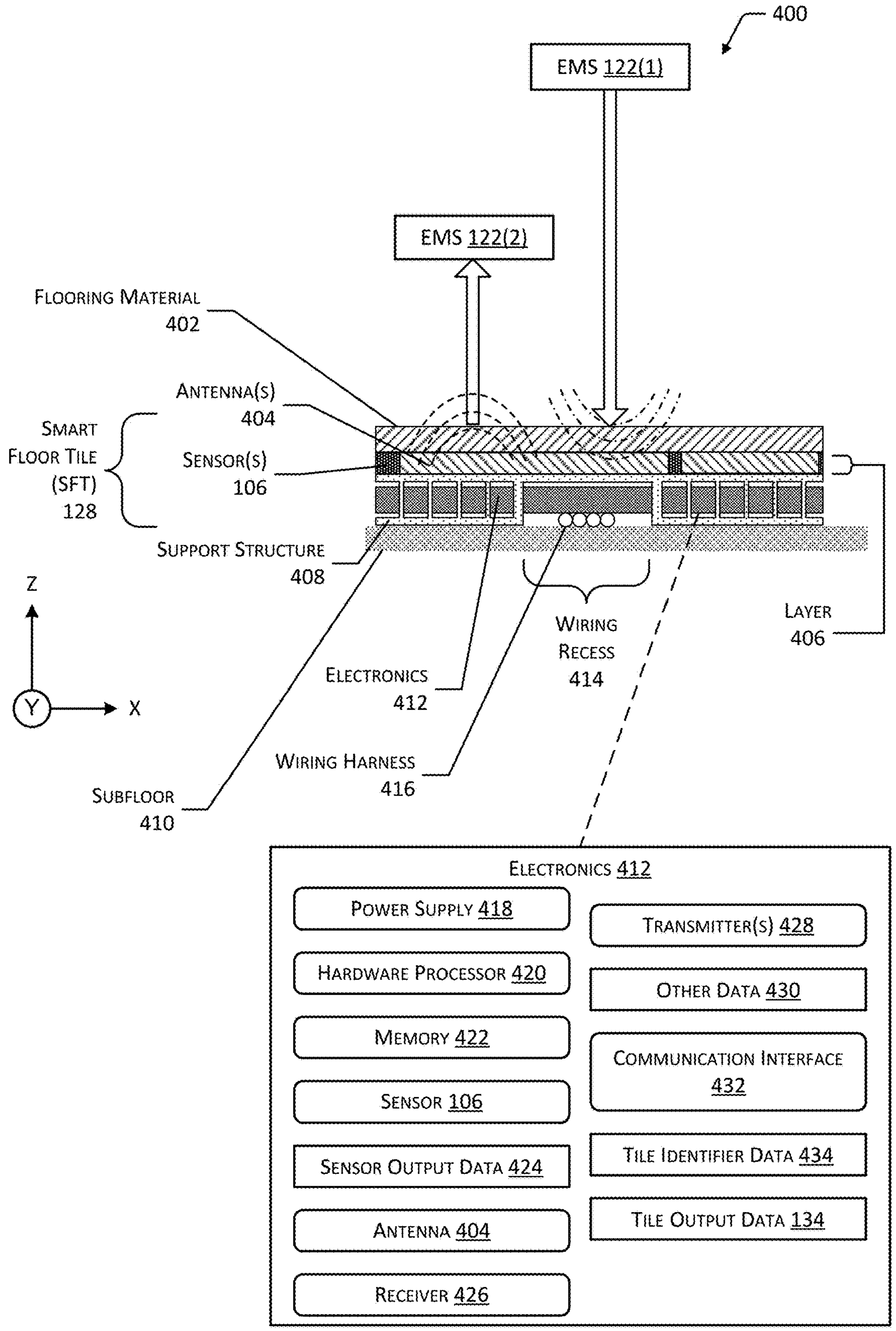
FIG. 4 illustrates a block diagram of a smart floor tile, according to some implementations.

FIG. 4 illustrates a block diagram 400 of a smart floor tile 128, according to some implementations. A side view of a portion of the SFT 128 depicts a top layer comprising a protective material, such as flooring material 402. The flooring material 402 is electrically non-conductive under ordinary conditions. For example, the flooring material 402 may include plastic, ceramic, wood, textile, or other material. Beneath a layer of flooring material 402 may be one or more antennas 404 and one or more sensors 106. The antennas 404 may comprise structures designed to accept or emit EMS 122. In some implementations, the antennas 404 may also serve as the flooring material 402. For example, the antennas 404 may comprise aluminum or steel sheets upon which the users 102 walk. The active portion of the antenna 404 comprises that portion of the antenna 404 that is used to radiate or receive an EMS 122.

The SFT 128 may include a plurality of antennas 404. For example, the antennas 404 may be arranged to form an array. In some implementations, the active portion of the antennas 404 may have a surface area that occupies at least 1 square inch. Each segment of the SFT 128 includes at least one segment antenna 404. The segment antenna 404 of the segment may be the same size as the segment or may be smaller. For example, the segment may be 4 inches by 4 inches square, but the segment antenna 404 in that segment may only be 2 inches by 2 inches square. In another example, the segment may be 4 inches by 4 inches square and the segment antenna 404 in that segment may be 4 inches by 4 inches square. Each segment antenna 404 may have a maximum size of sixteen square inches, in some implementations. The size of the segment antennas 404 may be determined at least in part based on the expected size of the objects in contact with the floor, such as the size of the foot of the user 102. In one implementation, antennas 404 may be shared, with a single antenna 404 being used to both transmit and receive either simultaneously or at different times. In another implementation, separate antennas 404 may be used to transmit and receive.

The SFT 128 may also include a plurality of sensors 106 that may be arranged to form one or more arrays. For example, the sensors 106 may include weight sensors that measure the weight applied to a particular segment. The sensors 106 provide sensor output data. The arrangement of an array of one type of sensor 106 may differ from another type of sensor 106. In some implementations, the sensors 106 may include a magnetometer that provides information about local magnetic fields.

As illustrated here, the antennas 404 may be located within a common plane. In other implementations, the antennas 404 may be arranged within a layer 406 that is above the sensors 106, below the sensors 106, and so forth. A load bearing support structure 408 may be beneath the sensors 106 and the antennas 404 and provides mechanical and physical separation between the underlying subfloor 410 upon which the SFT 128 rests and the flooring material 402. The support structure 408 may comprise a series of pillars, posts, ribs, or other vertical elements. The support structure 408 may comprise a composite material, plastic, ceramic, metal, or other material. In some implementations, the support structure 408 may be omitted, and electronics 412 or structures associated with the electronics 412 may be used to support a load on the flooring material 402. For example, the electronics 412 may comprise a glass fiber circuit board that provides mechanical support while also providing a surface for mounting the electronics 412. The subfloor 410 may comprise concrete, plywood, or existing flooring materials over which the SFT 128 is installed. In some implementations, the SFT 128 may be affixed to the subfloor 410, or may be unaffixed or "floating". For example, the SFT 128 may be adhered to the subfloor 410 using a pressure sensitive adhesive.

The SFT 128 includes the electronics 412. The electronics 412 may include the elements described elsewhere in more detail. In the implementation depicted here, the electronics 412 are arranged within the support structure 408. In some implementations, one or more of the antennas 404 or the sensors 106 may be located within the support structure 408. The support structure 408 may operate as a heat sink to dissipate heat generated by operation of the electronics 412.

The SFT 128 may incorporate a wiring recess 414 on an underside of the SFT 128. For example, the support structure 408 and the electronics 412 may be formed or arranged to provide a pathway for a wiring harness 416 to pass beneath at least a portion of the SFT 128. The wiring recess 414 may extend from one edge of the SFT 128 to another, may extend in different directions, and so forth. For example, the wiring recess 414 may be arranged in a "+" or cross shape, allowing for wiring harnesses 416 to pass along the X or Y axes as depicted here.

The wiring harness 416 may provide a coupling to one or more of the power supply 418, a network, and so forth. For example, the wiring harness 416 may include conductors that allow for the SFT 128 to receive electrical power from an electrical distribution network, allow for connection to a CAN bus network that services a cluster of SFTs 128, and so forth. The wiring harness 416 may include electrical conductors, electromagnetic waveguides, fiber optics, and so forth. In some implementations, a plurality of wiring harnesses 416 may be used. For example, a first wiring harness 416(1) may provide electrical power while a second wiring harness 416(2) provides network connectivity. In some implementations, the wiring harness 416 may be used to provide information that is then processed to determine a relative arrangement of SFTs 128.

The electronics 412 of the SFT 128 may include a power supply 418. The power supply 418 may include an electric power interface that allows for coupling to a power distribution system. For example, the electrical power interface may comprise connectors, voltage converters, frequency converters, and so forth. The power supply 418 may include circuitry that is configured to provide monitoring or other information with regard to the consumption of electrical power by the other electrical power components of the SFT 128. For example, the power supply 418 may include power conditioning circuitry, DC to DC converters, current limiting devices, current measurement devices, voltage measurement devices, and so forth. In some implementations, the SFT 128 may be configured to connect to redundant power buses. For example, a first electrical distribution network such as an "A" bus and a second electrical distribution network such as a "B" bus may be provided, each of which can provide sufficient electrical power for operation. In some implementations, the SFT 128 may incorporate redundant power supplies 418.

The SFT 128 may include one or more hardware processors 420. The hardware processors 420 may include microprocessors, microcontrollers, systems on a chip (SoC), field programmable gate arrays (FPGAs), and so forth. The SFT 128 may also include one or more memories 422. The memory 422 may comprise one or more non-transitory CRSM. The CRSM may be any one or more of an electronic storage medium, a magnetic storage medium, an optical storage medium, a quantum storage medium, a mechanical computer storage medium, and so forth. The memory 422 provides storage of computer-readable instructions, data structures, program modules, and other data for the operation of the SFT 128.

The SFT 128 may include electronics 412. The electronics 412 may be configured to acquire information from sensors 106 of the SFT 128, process that information, and so forth. In one implementation, the sensors 106 may comprise electrodes or other electrically conductive elements that are used as part of a capacitive sensor array. In one implementation, the electrodes may be arranged in an array. Each electrode may be rectangular with a first side and a second side, with the length of the first side and the second side being between 10 millimeters and 50 millimeters. In other implementations, other shapes and sizes of electrodes may be used.

The electronics 412 may include capacitance measurement circuitry that generates capacitance data. The capacitance measurement circuitry may use various techniques to determine capacitance. For example, the capacitance measurement circuitry may include a source that provides a predetermined voltage, a timer, and circuitry to measure voltage of the conductive element relative to the ground. By determining an amount of time that it takes to charge the conductive element to a particular voltage, the capacitance may be calculated. The capacitance measurement circuitry may use one or more of analog or digital circuits to determine capacitance. During operation, the capacitive sensor uses a conductive element located beneath the flooring material 402 to produce capacitance data indicating capacitance values at particular times. Based on the capacitance data, information such as a presence of an object, shape of an object, and so forth, may be generated to produce sensor output data 424. The sensor electronics 412 may be configured to scan the sensors 106 and generate sensor output data 424 at least 40 times per second. The sensor output data 424 may include information about proximity of an object with respect to a particular electrode. The sensor output data 424 may be further processed to generate the other data.

In other implementations, the sensors 106 may comprise optical touch sensors 108 comprising one or more illuminators and one or more photodetector elements, resistive touch sensors 108 comprising electrically resistive material, acoustic touch sensors 108 comprising one or more transducers, and so forth. The sensors 106 may include other sensors, such as a weight sensors, moisture detectors, microphones, and so forth.

The SFT 128 may include a receiver 426. The receiver 426 is configured to detect the EMS 122. The receiver 426 may be implemented as discrete circuitry, as a software defined radio (SDR), and so forth. The receiver 426 is coupled to one or more of the antennas 404. In some implementations, a single receiver 426 may be coupled to a single antenna 404. In other implementations, a single receiver 426 may be coupled to a plurality of antennas 404 by way of switching circuitry, matching network, and so forth. The switching circuitry may allow the selective connection of a particular antenna 404 to the receiver 426. The receiver 426 may be configured to detect the EMS 122 at a particular frequency and generate information indicative of a received signal strength.

In some implementations, elements of the sensors 106 may be combined or used in conjunction with the antennas 404. For example, electrically conductive elements may be used for both capacitive sensing by the sensor 106 and as antennas 404. This dual use may occur at the same time or may be multiplexed over time. For example, switching circuitry may, at a first time, selectively connect the sensor electronics 412 to the electrically conductive element for use as a capacitive sensor pad. The switching circuitry may then selectively connect, at a second time, the receiver 426 to the same electrically conductive element for use as an antenna 404.

The EMS 122 is acquired by the antenna 404 and then provided to the receiver 426. For example, the receiver 426 may comprise a superheterodyne receiver, with an incoming radio signal being converted to an intermediate frequency by a mixer. At the intermediate frequency stage, the downconverted signal is amplified and filtered before being fed to a demodulator. One or more antennas 404 may be dedicated for use by the receiver 426, while one or more other antennas 404 may be dedicated for use by the transmitter(s) 428. The use of separate antennas 404 to transmit and receive may improve isolation between the receiver 426 and the transmitter 428. The receiver 426 or the hardware processor 420 processes the EMS 122 to determine the characteristic data 136, such as a received frequency and the signal strength received at that frequency. In another implementation, the receiver 426 may comprise an SDR.

In some implementations, the EMS 122 may convey data. The receiver 426 or the hardware processor 420 may decode, decrypt, or otherwise demodulate and process the demodulated signal to determine the characteristic data 136. For example, the receiver 426 may provide as output the digital representation of a signal that incorporates binary phase shift keying (BPSK) or other techniques. The hardware processor 420 may process this digital representation to recover a serial data stream that includes framing, error control data, payload, and other information. The payload may then be processed to produce output. The error control data may include error detection data such as parity check data, parity bits, hash values, and so forth. For example, a hash function may be applied to the characteristic data 136 to generate hash output. A comparison of the hash output may be made to determine if an error is present.

The SFT 128 includes one or more transmitters 428. For example, the transmitter 428 may comprise a voltage controlled oscillator that generates an output signal that is fed directly to a power amplifier. The transmitter 428 couples to an antenna 404, which then radiates the EMS 122. The transmitter 428 may be implemented as discrete circuitry, SDR, or a combination thereof.

The transmitter 428 may accept multiple signals to generate the EMS 122 that is emitted from an antenna 404 connected to the output of the transmitter 428. In some implementations, each segment of the SFT 128 may utilize a single transmitter 428 that produces an EMS 122 that includes at least the segment signal. In other implementations, a single transmitter 428 may be used to generate all of the EMS 122 from a given SFT 128. For example, the transmitter 428 may generate the initial signal and all the respective segment signals for that SFT 128. Filters may be used on the output such that the antenna 404 at a particular segment emits only the desired frequency associated with that particular segment.

The transmitter 428 may be configured to produce an EMS 122 that is amplitude modulated, frequency modulated, phase modulated, and so forth. The transmitters 428 for the SFTs 128 in a given floor may operate on a single frequency, or may be frequency agile and operate on a plurality of different frequencies. For example, at a first time, a single transmitter 428 may generate the segment signals at a first frequency and then transition to transmitting at a second frequency. In some implementations, the receiver 426 and the transmitter 428 may be combined or share one or more components. For example, the receiver 426 and the transmitter 428 may share a common oscillator or frequency synthesizer.

In some implementations, a single antenna 404 may be used to both transmit and receive. For example, the receiver 426 may include notch filters to attenuate the frequencies of the transmitted EMS 122. A single antenna 404 may also be used to transmit different signals. For example, a single antenna 404 may be used to transmit the initial signal and a segment signal. In some implementations, a diplexer may be used that accepts input from two or more transmitters 428 and provides output of the EMS 122 to an antenna 404 or group of antennas 404. In other implementations, the diplexer or other filtering may be omitted, and one or more transmitters 428 may be coupled to a single antenna 404 or group of antennas 404.

The hardware processor 420 may acquire data from one or more of the sensors 106, the receiver 426, the transmitter 428, and so forth, to generate other data 430. The other data 430 comprises information about an object that is resting on or proximate to the flooring material 402. The information may be indicative of a shape of the object. In some implementations, the other data 430 may comprise information that is representative of the contours of an object. For example, the other data 430 may comprise a bitmap representative of the output from a plurality of sensors 106 and indicative of their relative arrangement. In another example, the other data 430 may comprise a vector value that is indicative of polygons used to represent an outline of an object. In some implementations, the other data 430 may be indicative of an area of the object. For example, the other data 430 may indicate that the total area of an object is 48 square centimeters. The other data 430 may include other information such as information about amplitude of a received EMS 122 with respect to different portions of the object. For example, other data 430 may be generated that indicates the shape of the object with information about amplitude, frequency, or other details about the EMS 122 at particular points or areas within that shape.

In some implementations, one or more of the receiver 426 or the transmitter 428 may be used to generate the sensor output data 424. For example, sensors 106 may communicate with the power supply 418 to determine the amount of electrical current that is being drawn at a particular time by the transmitter 428. As the electrical coupling between an object above the SFT 128 and one or more of the antennas 404 changes, one or more operating characteristics of the devices in the SFT 128 may change. For example, the impedance of the antenna 404 may experience change. Changes in the impedance may result in a change in the power output of the transmitter 428 during operation. For example, the transmitter 428 may exhibit an impedance mismatch with the antenna 404 in the presence of an object, such as a foot. This impedance mismatch may result in reduced power consumption by the radio frequency amplifier of the transmitter 428. Information about changes in the operational characteristics, such as a change in current draw by the transmitter 428, may be processed to determine the presence or absence of an object with respect to the antenna 404. The operating characteristics may include, but are not limited to: received signal strength at the receiver 426, power consumption of the transmitter 428, radio frequency power output of the transmitter 428, impedance presented at an antenna 404, standing wave ratio (SWR), and so forth. For example, the impedance of the antenna 404 may be measured at a radio frequency input to the receiver 426, a radio frequency output of the transmitter 428, and so forth. In another example, the SWR presented by one or more of the antennas 404 may be similarly measured. In other implementations, other operating characteristics may be used. For example, a change in the noise detected by the receiver 426 may be used to determine presence or absence of an object. In yet another implementation, the transmitter 428 of the SFT 128 may generate a signal that is then received by the receiver 426 of the same SFT 128. A change in the received signal at a particular antenna 404 may be used to determine the presence of an object. In still another implementation, the EMS 122 received from the other SFT 128 may be measured, and the received signal strength at particular segments may be used to generate information indicative of the presence of an object.

By combining information from a plurality of antennas 404, other data 430 may be generated. In other implementations, other characteristics of the receiver 426 or the transmitter 428 may be assessed to generate the other data 430 or other information indicative of proximity of an object to the antenna 404. For example, the change in impedance may be measured, a change in background noise level may be measured, and so forth. In some implementations, radio ranging may be utilized in which the transmitter 428 emits a pulse and the receiver 426 listens for a return or echo of that pulse. Data indicative of proximity from several antennas 404 may then be processed to generate the other data 430. In another implementation, distance between the object and the antenna 404 may be determined using the amplitude of the received EMS 122. For example, a lookup table may be used that associates a particular received signal strength with a particular distance from the antenna 404.

The communication interface 432 connects the SFT 128 to a network. For example, the communication interface 432 may be able to connect to one or more of a CAN bus, Inter-Integrated Circuit (I2C), Serial Peripheral Interface bus (SPI), 1-Wire bus, Universal Serial Bus (USB) as promulgated by the USB Implementers Forum, RS-232, Ethernet, Wi-Fi, Bluetooth, and so forth. The communication may be facilitated by data connectors, such as optical connectors, electrical connectors, and so forth. The data connectors provide a pathway for signals to be exchanged between the communication interface 432 and the network.

The SFT 128 may include non-transitory computer readable media that is used to store instructions, data, and so forth. Tile identifier data 434 comprises information indicative of a particular SFT 128. The tile identifier data 434 may be unique within the particular network, the facility, unique across the production of all SFTs 128 manufactured, and so forth. In some implementations, a media access control (MAC) address, network address, bus address, and so forth, that is associated with the communication interface 432 may be used as tile identifier data 434.

During operation, the hardware processor 420 may generate tile output data 134. As described above, the tile output data 134 may include the characteristic data 136. In some implementations, the tile output data 134 may indicate the characteristic data 136 that was received by the SFT 128, the particular antennas 404 or segments associated with that reception, information about the frequencies of EMS 122 that are being transmitted, and so forth. The tile output data 134 may also include the tile identifier data 434, timestamp data, and so forth. For example, the timestamp data included in the tile output data 134 may indicate when the characteristic data 136 was received by the receiver 426.

The SFT 128 may include multiple hardware processors 420 with different capabilities. For example, individual elements of the sensors 106 may utilize dedicated state machines to perform simple processing functions. These dedicated state machines may then send output data to a microcontroller that provides additional processing to generate sensor output data 424. In one implementation, the dedicated state machine may comprise a complex programmable logic device (CPLD). Continuing the example, a dedicated state machine may provide a 4 bit value indicative of the capacitance measured by a capacitive sensor 106 at a particular location on the SFT 128. The microcontroller may have information that describes a relative arrangement of the sensors 106, and may use this information in conjunction with the dedicated state machine output to generate a bitmap that may be included in the other data 430.

Various techniques may be used to increase the overall uptime of an individual SFT 128, and functionality of the floor as a whole. In one implementation, the SFT 128 may include additional components to provide for failover redundancy. For example, the SFT 128 may include at least two hardware processors 420, each of which is able to generate other data 430, generate tile output data 134, and so forth. In another example, the SFT 128 may include two power supplies 418, each connected to a different bus or power supply.

To provide additional redundancy, adjacent SFTs 128 may be connected to different networks. For example, an SFT 128 may be connected to a first network 110 while the SFT 128 immediately to the right may be connected to a second network 132.

The SFT 128 may be configured to perform diagnostics of onboard components, adjacent SFTs 128, and so forth. For example, the SFT 128 may be configured to test the receiver 426 and the transmitter 428 by transmitting a signal from the first antenna 404(1) and listening with the receiver 426 using a second antenna 404(2) that is adjacent to the first antenna 404(1). In some implementations, the SFT 128 may be configured to send diagnostic data using the network. For example, diagnostic data may be sent to the inventory management system 114 indicating that a particular SFT 128 has a fault and requires repair or replacement. The SFT 128 may be designed in a modular fashion to allow for repair or replacement without affecting adjacent SFTs 128.

In some implementations, operation of the SFT 128 or the segments therein may be responsive to presence or absence of an object. For example, segments that are proximate to or underneath the object forming a shape may be deemed active segments. Antennas 404 associated with these active segments may be used to transmit or receive the EMS 122. Inactive segments comprise segments that are not underneath or proximate to the object. The determination of whether a segment is active or not may be based at least in part on output from the sensor elements, antennas 404, or other sensors. For example, a segment may be deemed to be an active segment when the associated sensor element exhibits a capacitance value that exceeds a threshold level.

During operation, the determination of which segments are active may be used to determine which antennas 404 are used to one or more of transmit or receive the EMS 122. For example, the antennas 404 beneath inactive segments may be disconnected from receivers 426, or the receivers 426 associated with those antennas 404 may be placed in a low power mode or turned off. As an object is detected by the sensor element as driven using the electronics 412, a particular segment may be designated as an active segment. In this illustration, the active segments are represented with a crosshatch pattern. The antenna 404 and associated radio frequency elements such as the receiver 426 and the transmitter 428 associated with that antenna 404 may be transitioned to an operational mode. For example, the receiver 426 may begin listening for an EMS 122.

The SFT 128, or portions thereof such as segments, may transition from a receive mode to a transmit mode or vice versa. This transition may be responsive to the detection of an object by the sensor 106. For example, the presence of an object followed by the absence of the object may result in the SFT 128 transitioning from the transmit mode to the receive mode.

By selectively transmitting the EMS 122 using antennas 404 that are within a threshold distance of the shape as determined by the sensors 106, performance of the system may be improved. For example, power consumption may be reduced by transmitting using only those antennas 404 that are proximate to the object producing the shape. In other implementations, the transmitters 428 may be activated on a particular schedule, such as transmitting for 50 milliseconds duration with a gap waiting time of 100 ms before the next transmission. This reduction in duty cycle decreases power consumption.

In some implementations, segments may be in transmit mode while the receiver 426 is still active. For example, the transmitters 428 may transmit while the receiver 426 is listening.

The sensors 106 in the SFT 128 may be used to determine the presence of hazardous conditions at the SFT 128. For example, the sensors 106 may be able to detect a liquid that is present on the flooring material 402 that may comprise a slipping hazard. Continuing the example, a puddle of water on the flooring material 402 may be detected. Information indicative of the puddle may be provided to the inventory management system 114 for mitigation, such as clean up. In another example, the sensors 106 may be able to detect a user 102 lying on the flooring material 402. Upon such detection, an attendant of the facility may be alerted to provide assistance to the user 102. With this example, the floor provides information to the operators of the facility that may be used to improve the safety of the facility for the users 102.

Figure 5:
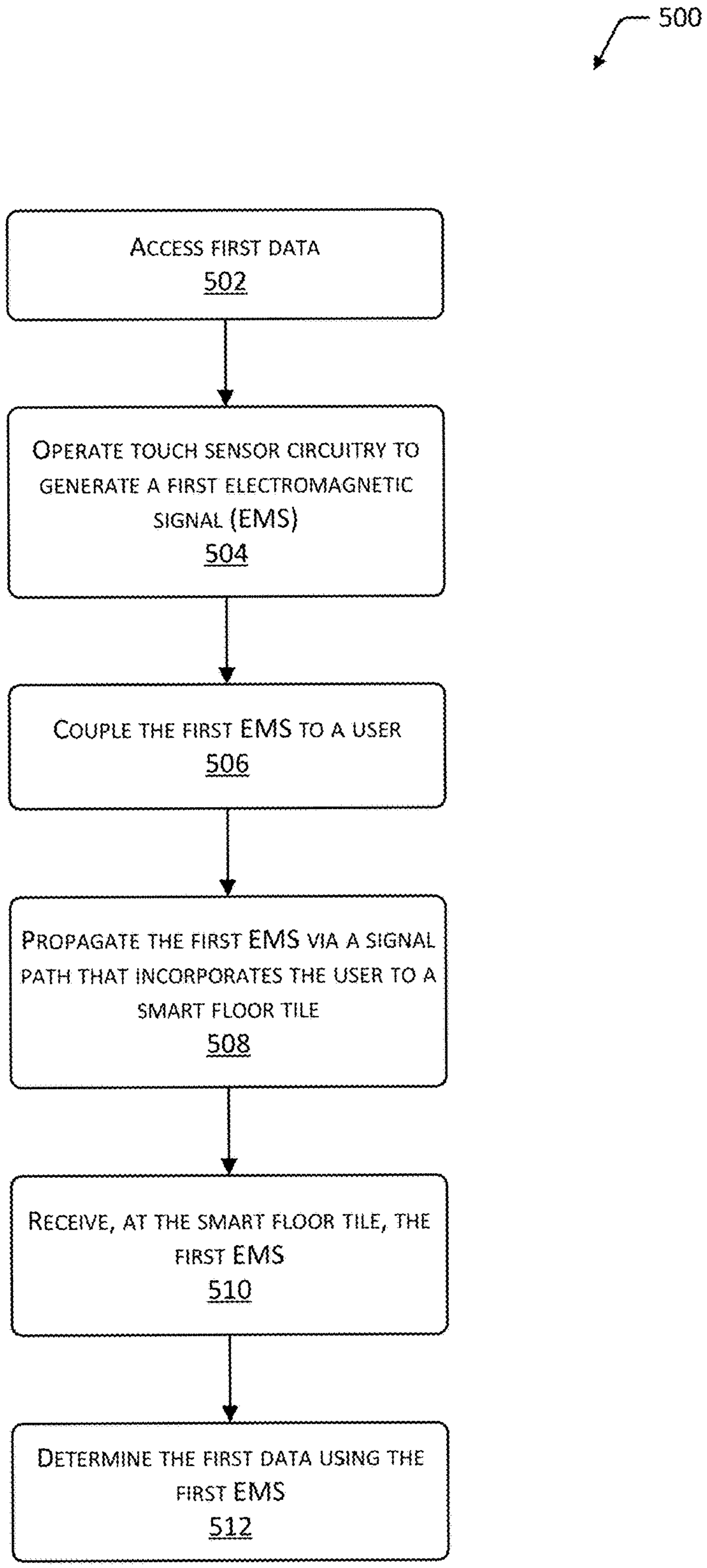
FIG. 5 depicts a flow diagram of a process of the portable device using a touch sensor to generate electromagnetic signals to communicate with a smart floor tile, according to some implementations.

FIG. 5 depicts a flow diagram 500 of a process of the portable device 104 using a touch sensor 108 to generate EMS 122 to communicate with an SFT 128, according to some implementations. The process may be implemented at least in part by the portable device 104.

At 502, first data 120 is accessed. In some implementations, the first data 120 may be generated by the portable device 104. For example, a biometric sensor 106(1) may be used to acquire biometric data about the user 102. The first data 120 may be based at least in part on the biometric data. For example, the biometric data may be compared with data previously stored on the portable device 104, or may be provided to an authentication module 116 to generate authentication data. The biometric data may comprise fingerprint data obtained from a fingerprint reader. In some implementations, the first data 120 may comprise a token or value that is indicative of a particular authentication session or task.

In other implementations, the first data 120 may comprise user input data that is obtained by the touch sensor 108. For example, the user input data may be indicative of an identity, such as password, PIN number, or other secret information using the touch sensor 108. The first data 120 may be generated based at least in part on the user input data, such as a hash of the password entered by the user 102. In another implementation, the user input data may be encrypted or otherwise used as an input to a function or module that then generates the first data 120.

At 504, the touch sensor circuitry 314 is operated to generate a first EMS 122. For example, the capacitive sensor circuitry in a capacitive touch sensor 108 may be configured to apply a particular voltage to one or more particular electrodes 306 at particular times, such that the first data 120 is conveyed by the resulting EMS 122.

At 506, the first EMS 122 is coupled to the user 102. For example, the finger 302 of the user 102 may be capacitively coupled to one or more of the electrodes 306 in the touch array 310.

At 508, the first EMS 122 is propagated to an SFT 128 via a signal path 124 that incorporates the user 102. For example, the EMS 122 may be of a frequency that is passed via skin effect along the surface of the user 102.

At 510, the SFT 128 receives the first EMS 122. For example, the receiver 426 in the SFT 128 is connected to an antenna 404 that is also electromagnetically coupled to the user 102. The receiver 426 may then receive the first EMS 122.

At 512, the first data 120 is determined using the first EMS 122. For example, the first EMS 122 may be decoded to provide the first data 120. Continuing the earlier example, the first data 120 may comprise authentication data. In some implementations, the SFT 128 may send the first data 120, or data based at least in part thereon, to the server 112.

By using this technique, the ability to generate EMS 122 and provide for the communication described herein is enabled without the need for dedicated hardware, such as the EMS transceiver 214. As a result, significant benefits are realized such as a reduced cost for bill of materials, assembly costs, and so forth, consistent with a reduction in overall parts count. Furthermore, existing portable devices 104 may be provided with executable instructions that allow for this functionality using their existing hardware.

Figure 6:
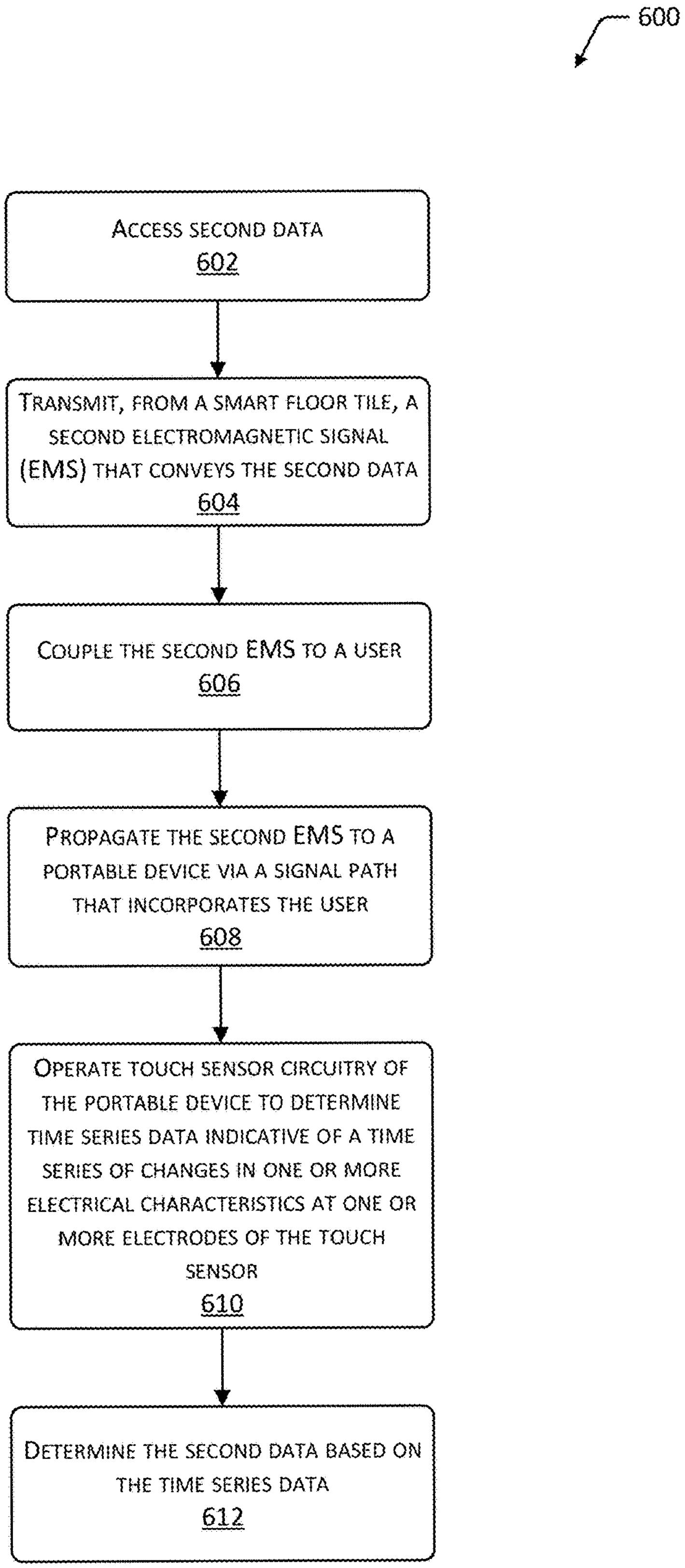
FIG. 6 depicts a flow diagram of a process of the portable device using a touch sensor to receive electromagnetic signals transmitted by a smart floor tile, according to some implementations.

FIG. 6 depicts a flow diagram 600 of a process of the portable device 104 using a touch sensor 108 to receive EMS 122 transmitted by an SFT 128, according to some implementations. The process may be implemented at least in part by the portable device 104.

At 602, the SFT 128 accesses second data 130. For example, the second data 130 may comprise a token, or other value generated by the SFT 128 or received from the server 112. For example, the SFT 128 may generate a value that is based at least in part on the unique identifier associated with the SFT 128.

At 604, the SFT 128 transmits a second EMS 122 that conveys the second data 130. For example, the transmitter 428 of the SFT 128 may generate a signal that is radiated by an antenna 404 that is connected to the transmitter 428.

At 606, the second EMS 122 is coupled to the user 102. For example, the foot of the user 102 may be capacitively coupled to the antenna 404 of the SFT 128.

At 608, the second EMS 122 is propagated to the portable device 104 via a signal path 124 that incorporates the user 102.

At 610, the touch sensor circuitry 314 is operated to determine the time series data 316. As described above, the time series data 316 may be indicative of changes in one or more electrical characteristics at one or more of the electrodes 306 of the touch sensor 108. For example, the time series data 316 may comprise timestamps and the addresses indicative of particular junctions 308 and changes in one or more electrical characteristics for each of those junctions 308 that are associated with the perspective timestamps.

At 612, the second data 130 is determined based on the time series data 316. For example, the time series data 316 may be indicative of "phantom" or electronically induced touch events that are responsive to the second EMS 122. Continuing the example, the second EMS 122 may be modulated using on-off keying (OOK) to convey the second data 130. In some implementations, the second data 130 may comprise authentication data, or other information.

Communication between the portable device 104 and the SFT 128 may be unidirectional or bidirectional. For example, the SFT 128 may emit EMS 122 and the portable device 104 receives those EMS 122 and determines the second data 130 conveyed therein. In another example, the portable device 104 transmit the first EMS 122(1) and the SFT 128 may transmit the second EMS 122(2). By utilizing the communication, either unidirectional or bidirectional, between the portable device 104 and the SFT 128, data may be exchanged that is subsequently used to associate a particular user 102 with a particular location, such as that of the SFT 128. By using biometric data, physical presence of the user 102 at a particular location may be assured at a particular time.

By using this technique, the ability to receive the EMS 122 and provide for the communication described herein is enabled without the need for dedicated hardware, such as the EMS transceiver 214. As a result, significant benefits are realized such as a reduced cost for bill of materials, assembly costs, and so forth, consistent with a reduction in overall parts count.

Figure 7:
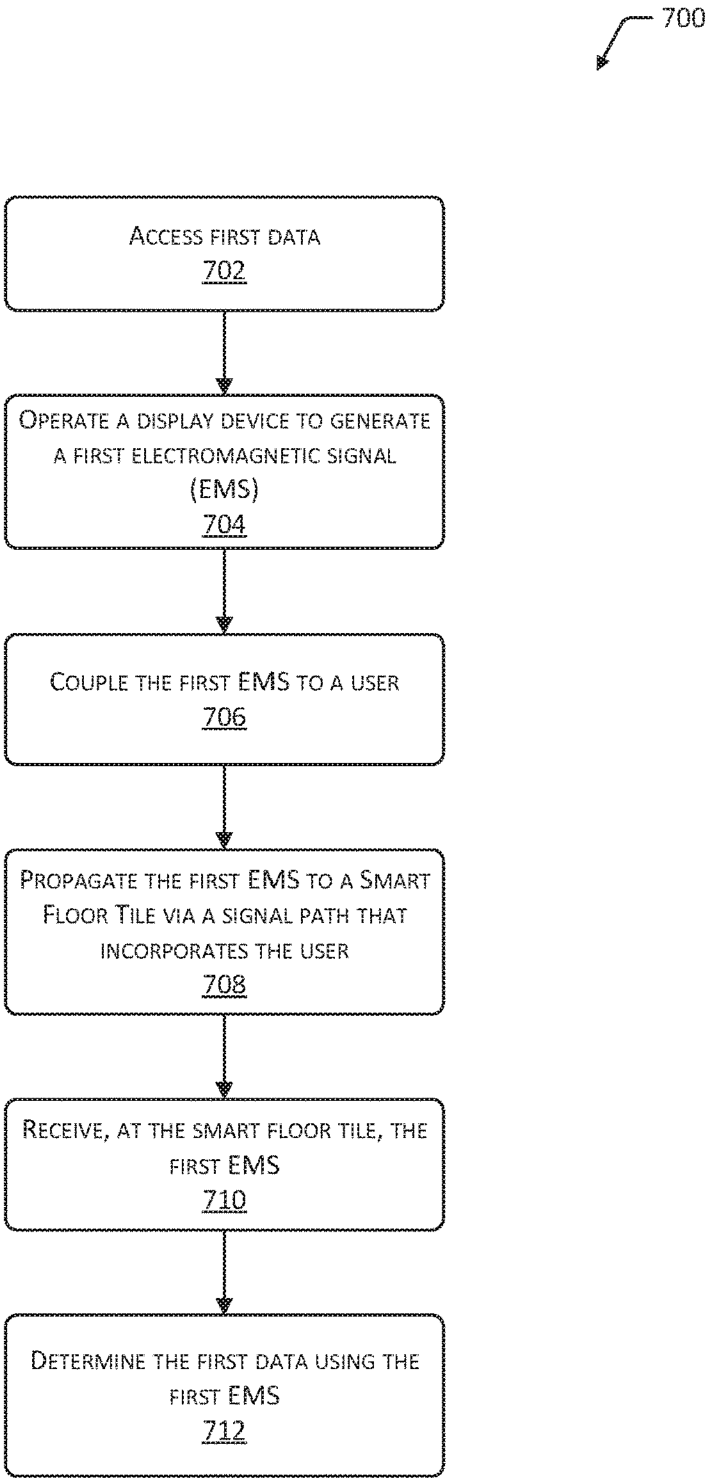
FIG. 7 depicts a flow diagram of a process of the portable device using a display device to generate electromagnetic signals to communicate with a smart floor tile, according to some implementations.

FIG. 7 depicts a flow diagram 700 of a process of the portable device 104 using a display device 312 to generate EMS 122 to communicate with an SFT 128, according to some implementations. The process may be implemented at least in part by the portable device 104. Furthermore, existing portable devices 104 may be provided with executable instructions that allow for this functionality using their existing hardware.

At 702, first data 120 is accessed. As described above, the first data 120 may be generated by the portable device 104, by the server 112, or a combination of the two.

At 704, the display device 312 is operated to generate a first EMS 122. For example, one or more of the voltage or amperage used to drive a pixel within the display device 312 may be increased for a specified period of time. In some implementations, the voltage or amperage may exceed the normal operating specifications for the elements of the pixel, however this surge may be for a duration of time that is short enough to prevent damage to the elements of the pixel. In other implementations, one or more of the pixels may be driven between particular states, such as off-and-on at particular times in order to generate the EMS 122.

At 706, the first EMS 122 is coupled to the user 102. For example, the finger 302 of the user 102 that is in contact with or proximate to the display device 312 may be capacitively coupled to one or more of the electrodes 306, transistors, diodes, or other elements that the pixels in the display device 312 comprise.

At 708, the first EMS 122 is propagated to an SFT 128 via a signal path 124 that incorporates the user 102. For example, the EMS 122 may be of a frequency that is passed via skin effect along the surface of the user 102.

At 710, the SFT 128 receives the first EMS 122. For example, the receiver 426 in the SFT 128 is connected to an antenna 404 that is also electromagnetically coupled to the user 102. The receiver 426 may then receive the first EMS 122.

At 712, the first data 120 is determined using the first EMS 122. For example, the first EMS 122 may be decoded to provide the first data 120. Continuing the earlier example, the first data 120 may comprise authentication data. In some implementations, the SFT 128 may send the first data 120, or data based at least in part thereon, to the server 112.

By using this technique, the display device 312 may be used to generate the EMS 122, facilitating an extremely localized communication pathway, suitable for the exchange of information such as authentication data.

Figure 8:
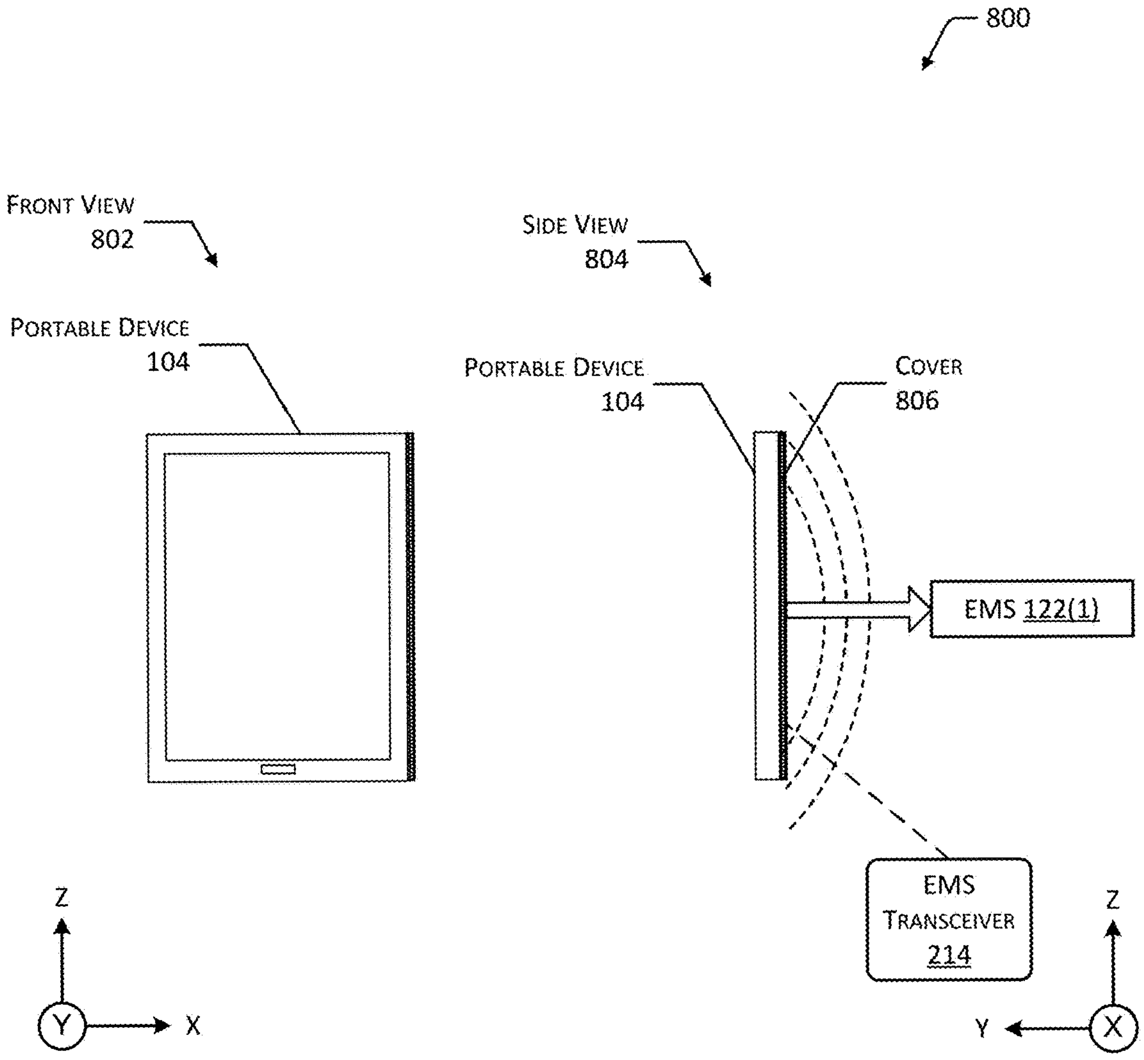
FIG. 8 depicts a diagram of a portable device with a cover that includes one or more of a transmitter or a receiver to provide communication with a smart floor tile, according to some implementations.

FIG. 8 depicts a diagram 800 of a portable device with a cover that includes one or more of a transmitter or a receiver to provide communication with a smart floor tile 128, according to some implementations.

A front view 802 and a side view 804 are presented. A cover 806 comprises an accessory that may be attached to the portable device 104. For example, the cover 806 may comprise mechanical, magnetic, or other types of fastener that joins the two. The cover 806 may include one or more of the elements described above with regard to the portable device 104. For example, the cover 806 may include a power supply 202, or mechanisms to draw power from the portable device 104, may include an EMS transceiver 214, and so forth. The cover 806 may include one or more antennas that are connected to the EMS transceiver 214. During operation, the cover 806 may be used to transmit EMS 122, receive EMS 122, or both. The cover 806 allows the functionality described herein to be provided to the portable device 104. In some implementations, the cover 806 may provide other functionalities. For example, the cover 806 may include a battery to provide power to the portable device 104, photovoltaic cells, sensors 106, and so forth.

Figure 9:
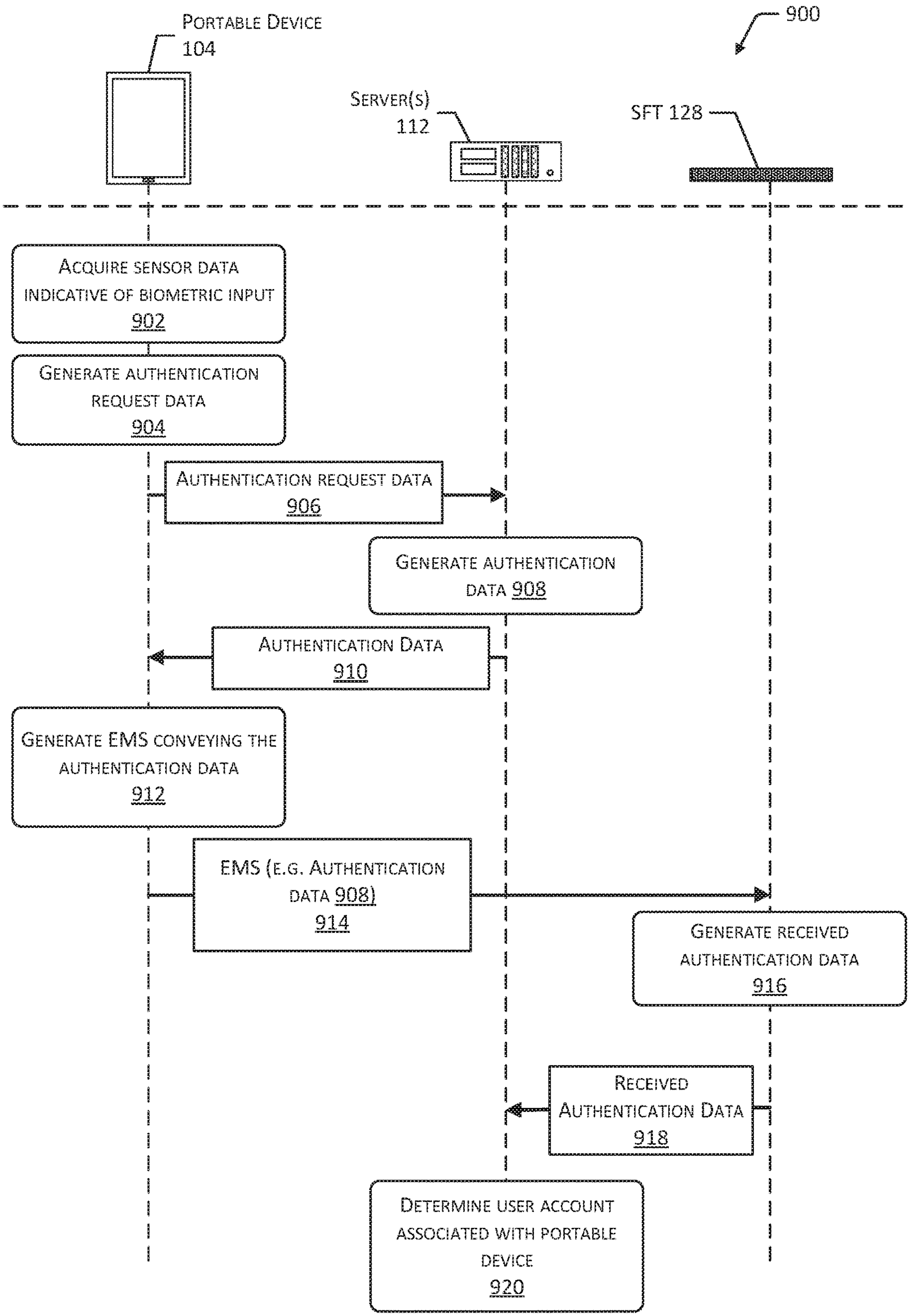
FIG. 9 depicts a flow diagram of a process of authenticating a user that includes a transfer of data between the portable device and the smart floor tile, according to some implementations.

FIG. 9 depicts a flow diagram 900 of a process of authenticating a user 102 that includes a transfer of data between the portable device 104 and the smart floor tile 128, according to some implementations. The process may be implemented at least in part by one or more of the portable device 104, the SFT 128, the server 112, and so forth.

At 902, the portable device 104 acquires sensor data 230 indicative of biometric input. For example, the user 102 may place a finger 302 on a fingerprint reader that then generates fingerprint data. In another example, the user 102 may look at a camera that acquires an image of their face, iris, ears, and so forth.

At 904, the portable device 104 generates authentication request data. For example, the authentication request data may comprise a hash, encrypted value, or other information that is based at least in part on the fingerprint data. At 906, the authentication request data is then sent from the portable device 104 to the server 112. For example, the portable device 104 may use a network interface 212 to send the authentication request data 906 to the server 112.

At 908, the server 112 generates authentication data. For example, the authentication module 116 may process the authentication request data 906 to determine if the fingerprint data matches the value that has been previously stored in the account data 118. When a match is determined, authentication data is generated that may comprise a token, value, or other information indicative of a particular user account that is indicated by the account data 118.

At 910, the authentication data is sent from the server 112 to the portable device 104. For example, the server 112 may use a network interface 212 to send the authentication data to the portable device 104.

At 912, the portable device 104 generates an EMS 122 that conveys the authentication data, or information based at least in part on the authentication data.

At 914, the EMS 122 is transmitted from the portable device 104 via the signal path 124 to the SFT 128. For example, the EMS 122 may be generated by one or more of the touch sensor 108, the display device 312, the EMS transceiver 214, and so forth.

At 916, the SFT 128 receives and processes the EMS 122 and generates received authentication data.

At 918, the SFT 128 sends the received authentication data to the server 112. For example, the SFT 128 may use the communication interface 432 and transmit the received authentication data to the server 112 using the second network 132.

At 920, based on the authentication data and the received authentication data, the server 112 determines the user account that is associated with the portable device 104. The received authentication data may be used to search the account data 118 to determine a particular user account. The authentication data that was previously generated and associated with the particular user account may then be retrieved. The authentication data that was originally generated and sent to the portable device 104 may then be compared to the received authentication data that was sent to the SFT 128. If the comparison indicates a match that exceeds a threshold value, the user 102 may be authenticated to the particular user account.

In some implementations, the process may be modified in a variety of ways. For example, the authentication data may be transmitted using the EMS 122 and provided to the SFT 128. The SFT 128 may then communicate with the server 112 to determine if the authentication data (such as fingerprint data) transmitted via the EMS 122 corresponds to a particular user account.

In another implementation, the SFT 128 may generate a value, that is transmitted using the EMS 122. The value may be one that is specific to a particular SFT 128, that changes with time, and so forth. The SFT 128 may send that value to the server 112, or the server 112 may use the same algorithm and based on the same initialization vector as the SFT 128 may generate the same value locally. The portable device 104 may obtain biometric data about the user 102, and send data based at least in part on the biometric data to the server 112. The portable device 104 may also obtain the value transmitted by the SFT 128. The server 112 may determine if the value received from the SFT 128 as obtained by the portable device 104 matches that which was known to have been sent by the SFT 128. In the event of a match, the particular user account associated with the biometric data may be authenticated to the user 102.

It is recognized that other implementations may be used to take advantage of the localized communication between the SFT 128 and the portable device 104 as afforded by the EMS 122. By using this localized communication with devices such as the SFT 128 which is located at the facility, biometric data, user input data, or other information may be obtained by the portable device 104 and associated with a particular user 102 who is present at the facility.

Figure 10:
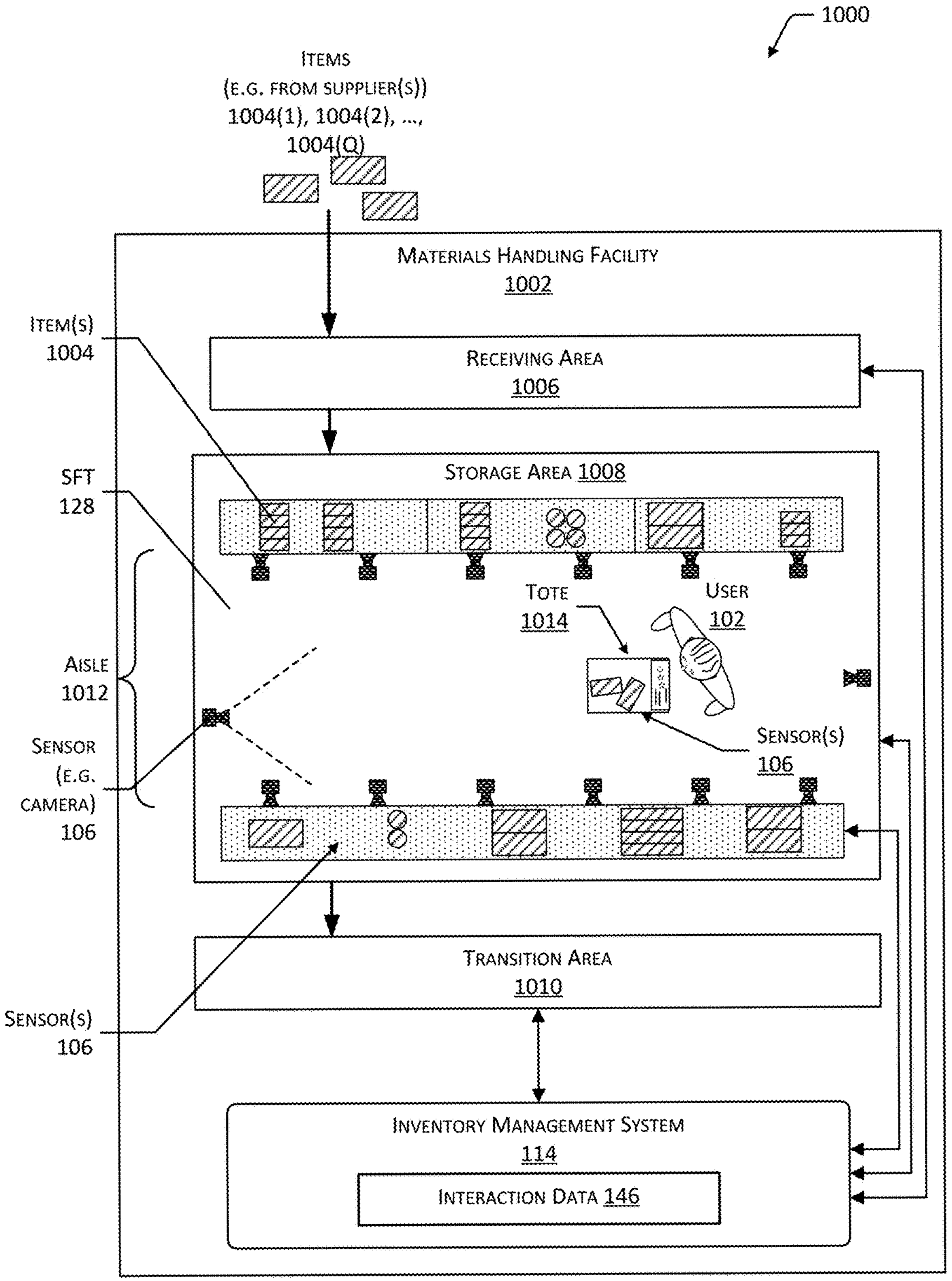
FIG. 10 is a block diagram illustrating a materials handling facility (facility) using the system, according to some implementations.

FIG. 10 is a block diagram 1000 illustrating a materials handling facility (facility) 1002 using the system 100, according to some implementations. A facility 1002 comprises one or more physical structures or areas within which one or more items 1004(1), 1004(2), . . . , 1004(Q) may be held. The items 1004 may comprise physical goods, such as books, pharmaceuticals, repair parts, electronic gear, and so forth.

The facility 1002 may include one or more areas designated for different functions with regard to inventory handling. In this illustration, the facility 1002 includes a receiving area 1006, a storage area 1008, and a transition area 1010. Throughout the facility 1002, the plurality of SFTs 128 may be deployed as described above.

The receiving area 1006 may be configured to accept items 1004, such as from suppliers, for intake into the facility 1002. For example, the receiving area 1006 may include a loading dock at which trucks or other freight conveyances unload the items 1004. In some implementations, the items 1004 may be processed, such as at the receiving area 1006, to generate at least a portion of item data as described below. For example, an item 1004 may be tested at the receiving area 1006 to determine the attenuation of an EMS 122 passing through it, and this information stored as item data.

The storage area 1008 is configured to store the items 1004. The storage area 1008 may be arranged in various physical configurations. In one implementation, the storage area 1008 may include one or more aisles 1012. The aisle 1012 may be configured with, or defined by, the fixtures on one or both sides of the aisle 1012. The fixtures may include one or more of a shelf, a rack, a case, a cabinet, a bin, a floor location, or other suitable storage mechanisms for holding, supporting, or storing the items 1004. For example, the fixtures may comprise shelves with lanes designated therein. The fixtures may be affixed to the floor or another portion of the structure of the facility 1002. The fixtures may also be movable such that the arrangements of aisles 1012 may be reconfigurable. In some implementations, the fixtures may be configured to move independently of an outside operator. For example, the fixtures may comprise a rack with a power source and a motor, operable by a computing device to allow the rack to move from one location within the facility 1002 to another.

One or more users 102 and totes 1014 or other material handling apparatus may move within the facility 1002. For example, the user 102 may move about within the facility 1002 to pick or place the items 1004 in various fixtures, placing them on the tote 1014 for ease of transport. The tote 1014 is configured to carry or otherwise transport one or more items 1004. For example, the tote 1014 may include a basket, cart, bag, bin, and so forth. In other implementations, other material handling apparatuses such as robots, forklifts, cranes, aerial drones, and so forth, may move about the facility 1002 picking, placing, or otherwise moving the items 1004. For example, a robot may pick an item 1004 from a first fixture and move the item 1004 to a second fixture.

One or more sensors 106 may be configured to acquire information in the facility 1002. The sensors 106 may include, but are not limited to, weight sensors 106(2), image sensors 106(3), depth sensors 106(4), and so forth. The sensors 106 may be stationary or mobile, relative to the facility 1002. For example, the fixtures may contain weight sensors 106(2) to acquire weight sensor data of items 1004 stowed therein, image sensors 106(3) to acquire images of picking or placement of items 1004 on shelves, optical sensor arrays 106(13) to detect shadows of the user's 102 hands at the fixtures, and so forth. In another example, the facility 1002 may include image sensors 106(3) to obtain images of the user 102 or other objects in the facility 1002. The sensors 106 are discussed in more detail below with regard to FIG. 11.

While the storage area 1008 is depicted as having one or more aisles 1012, fixtures storing the items 1004, sensors 106, and so forth, it is understood that the receiving area 1006, the transition area 1010, or other areas of the facility 1002 may be similarly equipped. Furthermore, the arrangement of the various areas within the facility 1002 is depicted functionally rather than schematically. For example, in some implementations, multiple different receiving areas 1006, storage areas 1008, and transition areas 1010 may be interspersed rather than segregated in the facility 1002.

The facility 1002 may include, or be coupled to, the inventory management system 114. The inventory management system 114 is configured to interact with one or more of the users 102 or devices such as sensors 106, robots, material handling equipment, computing devices, and so forth, in one or more of the receiving area 1006, the storage area 1008, or the transition area 1010.

During operation of the facility 1002, the sensors 106 may be configured to provide sensor data 230, or information based on the sensor data 230, to the inventory management system 114. The sensor data 230 may include the weight data, the capacitance data, the image data, and so forth. The sensors 106 are described in more detail below with regard to FIG. 11.

The inventory management system 114 or other systems may use the sensor data 230 to track the location of objects within the facility 1002, movement of the objects, or provide other functionality. Objects may include, but are not limited to, items 1004, users 102, totes 1014, and so forth. For example, a series of images acquired by the image sensor 106(3) may indicate removal by the user 102 of an item 1004 from a particular location on the fixture and placement of the item 1004 on or at least partially within the tote 1014.

The facility 1002 may be configured to receive different kinds of items 1004 from various suppliers and to store them until a customer orders or retrieves one or more of the items 1004. A general flow of items 1004 through the facility 1002 is indicated by the arrows of FIG. 10. Specifically, as illustrated in this example, items 1004 may be received from one or more suppliers, such as manufacturers, distributors, wholesalers, and so forth, at the receiving area 1006. In various implementations, the items 1004 may include merchandise, commodities, perishables, or any suitable type of item 1004, depending on the nature of the enterprise that operates the facility 1002.

Upon being received from a supplier at the receiving area 1006, the items 1004 may be prepared for storage in the storage area 1008. For example, in some implementations, items 1004 may be unpacked or otherwise rearranged. The inventory management system 114 may include one or more software applications executing on a computer system to provide inventory management functions. These inventory management functions may include maintaining information indicative of the type, quantity, condition, cost, location, weight, or any other suitable parameters with respect to the items 1004. The items 1004 may be stocked, managed, or dispensed in terms of countable units, individual units, or multiple units, such as packages, cartons, crates, pallets, or other suitable aggregations. Alternatively, some items 1004, such as bulk products, commodities, and so forth, may be stored in continuous or arbitrarily divisible amounts that may not be inherently organized into countable units. Such items 1004 may be managed in terms of a measurable quantity such as units of length, area, volume, weight, time, duration, or other dimensional properties characterized by units of measurement. Generally speaking, a quantity of an item 1004 may refer to either a countable number of individual or aggregate units of an item 1004 or a measurable amount of an item 1004, as appropriate.

After arriving through the receiving area 1006, items 1004 may be stored within the storage area 1008. In some implementations, like items 1004 may be stored or displayed together in the fixtures such as in bins, on shelves, hanging from pegboards, and so forth. For example, all items 1004 of a given kind are stored in one fixture. In other implementations, like items 1004 may be stored in different fixtures. For example, to optimize retrieval of certain items 1004 having frequent turnover within a large physical facility 1002, those items 1004 may be stored in several different fixtures to reduce congestion that might occur at a single fixture.

When a customer order specifying one or more items 1004 is received, or as a user 102 progresses through the facility 1002, the corresponding items 1004 may be selected or "picked" from the fixtures containing those items 1004. In various implementations, item picking may range from manual to completely automated picking. For example, in one implementation, a user 102 may have a list of items 1004 they desire and may progress through the facility 1002 picking items 1004 from the fixtures within the storage area 1008 and placing those items 1004 into a tote 1014. In other implementations, employees of the facility 1002 may pick items 1004 using written or electronic pick lists derived from customer orders. These picked items 1004 may be placed into the tote 1014 as the employee progresses through the facility 1002.

After items 1004 have been picked, the items 1004 may be processed at the transition area 1010. The transition area 1010 may be any designated area within the facility 1002 where items 1004 are transitioned from one location to another or from one entity to another. For example, the transition area 1010 may be a packing station within the facility 1002. When the item 1004 arrives at the transition area 1010, the item 1004 may be transitioned from the storage area 1008 to the packing station. Information about the transition may be maintained by the inventory management system 114.

In another example, if the items 1004 are departing the facility 1002, a list of the items 1004 may be obtained and used by the inventory management system 114 to transition responsibility for, or custody of, the items 1004 from the facility 1002 to another entity. For example, a carrier may accept the items 1004 for transport with that carrier accepting responsibility for the items 1004 indicated in the list. In another example, a user 102 may purchase or rent the items 1004 and remove the items 1004 from the facility 1002. During use of the facility 1002, the user 102 may move about the facility 1002 to perform various tasks, such as picking or placing the items 1004 in the fixtures.

The inventory management system 114 may generate the interaction data 146. The interaction data 146 may be based at least in part on one or more of the tile output data 134, the fixture data, and so forth. The interaction data 146 may provide information about an interaction, such as a pick of an item 1004 from the fixture, a place of an item 1004 to the fixture, a touch made to an item 1004 at the fixture, a gesture associated with an item 1004 at the fixture, and so forth. The interaction data 146 may include one or more of the type of interaction, duration of interaction, interaction location identifier indicative of where from the fixture the interaction took place, item identifier, quantity change to the item 1004, user identifier, and so forth. The interaction data 146 may then be used to further update the item data. For example, the quantity of items 1004 on hand at a particular lane on the shelf may be changed based on an interaction that picks or places one or more items 1004.

The inventory management system 114 may combine or otherwise utilize data from different sensors 106 of different types. For example, weight data obtained from weight sensors 106(2) at the fixture may be used instead of, or in conjunction with, one or more of the capacitance data to determine the interaction data 146.

Figure 11:
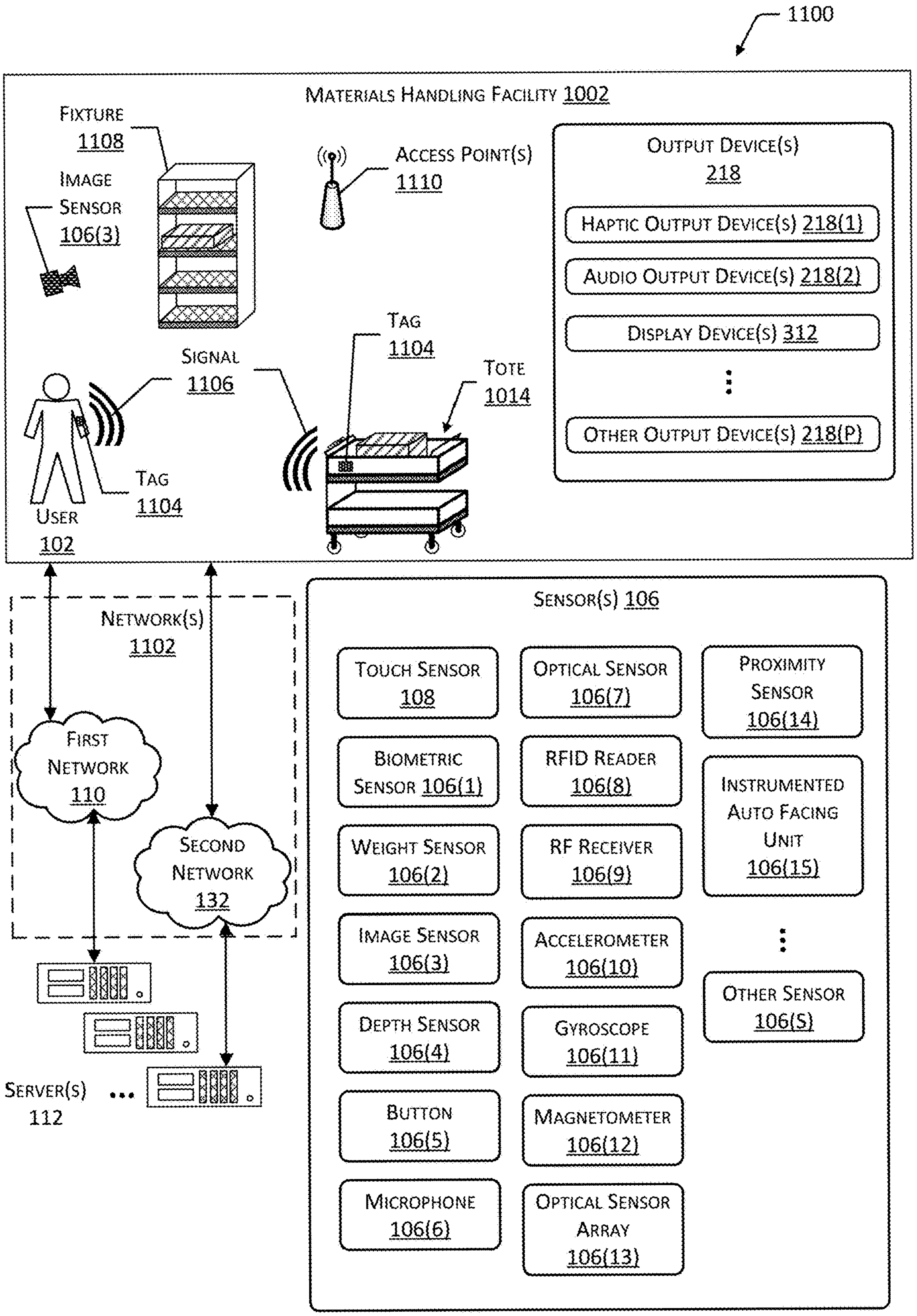
FIG. 11 is a block diagram illustrating additional details of the facility, according to some implementations.

FIG. 11 is a block diagram 1100 illustrating additional details of the facility 1002, according to some implementations. The facility 1002 may be connected to one or more networks 1102, which in turn connect to one or more servers 112. The networks 1102 may include one or more of the first network 110, the second network 132, or other networks. The network 1102 may include private networks such as an institutional or personal intranet, public networks such as the Internet, or a combination thereof. The network 1102 may utilize wired technologies (e.g., wires, fiber optic cables, and so forth), wireless technologies (e.g., radio frequency, infrared, acoustic, optical, and so forth), or other connection technologies. The network 1102 is representative of any type of communication network, including one or more of data networks or voice networks. The network 1102 may be implemented using wired infrastructure (e.g., copper cable, fiber optic cable, and so forth), a wireless infrastructure (e.g., cellular, microwave, satellite, and so forth), or other connection technologies.

The servers 112 may be configured to execute one or more modules or software applications associated with the inventory management system 114 or other systems. While the servers 112 are illustrated as being in a location outside of the facility 1002, in other implementations, at least a portion of the servers 112 may be located at the facility 1002. The servers 112 are discussed in more detail below with regard to FIG. 12.

The users 102, the totes 1014, or other objects in the facility 1002 may be equipped with one or more tags 1104. The tags 1104 may be configured to emit a signal 1106. In one implementation, the tag 1104 may be a RFID tag 1104 configured to emit an RF signal 1106 upon activation by an external signal. For example, the external signal may comprise a radio frequency signal or a magnetic field configured to energize or activate the RFID tag 1104. In another implementation, the tag 1104 may comprise a transmitter and a power source configured to power the transmitter. For example, the tag 1104 may comprise a Bluetooth Low Energy (BLE) transmitter and battery. In other implementations, the tag 1104 may use other techniques to indicate presence of the tag 1104. For example, an acoustic tag 1104 may be configured to generate an ultrasonic signal 1106, which is detected by corresponding acoustic receivers. In yet another implementation, the tag 1104 may be configured to emit an optical signal 1106.

The inventory management system 114 may be configured to use the tags 1104 for one or more of identification of the object, determining a location of the object, and so forth. For example, the users 102 may wear tags 1104, the totes 1014 may have tags 1104 affixed, and so forth, which may be read and, based at least in part on signal strength, used to determine identity and location. In other implementations, the users 102 may wear portable transmitters, the totes 1014 may be equipped with a portable receiver, portable transmitter, and so forth. In some implementations, the two methodologies may be combined, such as tags 1104 and the use of a portable transmitter.

Generally, the inventory management system 114 or other systems associated with the facility 1002 may include any number and combination of input components, output components, and servers 112.

The one or more sensors 106 may be arranged at one or more locations within the facility 1002. For example, the sensors 106 may be mounted on or within a floor, wall, at a ceiling, at fixture 1108, on a tote 1014, may be carried or worn by a user 102, may be part of the portable device 104, and so forth.

The sensors 106 may include one or more touch sensors 108, such as described above. The touch sensors 108 may use resistive, capacitive, surface capacitance, projected capacitance, mutual capacitance, optical, acoustic, Interpolating Force-Sensitive Resistance (IFSR), or other mechanisms to determine the position of a touch or near-touch. For example, a force sensitive resistor may comprise a material configured to change electrical resistance responsive to an applied force. The location within the material of that change in electrical resistance may indicate the position of the touch. The inventory management system 114 may use the sensor data 230 acquired by the touch sensors 108 to receive information from the user 102.

The sensors 106 may include one or more biometric sensors 106(1). For example, the biometric sensors 106(1) may include fingerprint readers, iris cameras, facial recognition cameras, palmprint readers, electrocardiogram devices, and so forth.

The sensors 106 may include one or more weight sensors 106(2) that are configured to measure the weight of a load, such as the item 1004, the tote 1014, or other objects. The weight sensors 106(2) may be configured to measure the weight of the load at one or more of the fixtures 1108, the tote 1014, on the floor of the facility 1002, and so forth. For example, the shelf may include a plurality of lanes or platforms, with one or more weight sensors 106(2) beneath each one to provide weight sensor data about an individual lane or platform. The weight sensors 106(2) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 106(2) may operate as transducers that generate one or more signals based on an applied force, such as that of the load due to gravity. For example, the weight sensor 106(2) may comprise a load cell having a strain gauge and a structural member that deforms slightly when weight is applied. By measuring a change in the electrical characteristic of the strain gauge, such as capacitance or resistance, the weight may be determined. In another example, the weight sensor 106(2) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 114 may use the data acquired by the weight sensors 106(2) to identify an object, determine a change in the quantity of objects, determine a location of an object, maintain shipping records, and so forth.

The sensors 106 may include one or more image sensors 106(3). The one or more image sensors 106(3) may include imaging sensors configured to acquire images of a scene. The image sensors 106(3) are configured to detect light in one or more wavelengths including, but not limited to, terahertz, infrared, visible, ultraviolet, and so forth. The image sensors 106(3) may comprise charge coupled devices (CCD), complementary metal oxide semiconductor (CMOS) devices, microbolometers, and so forth. The inventory management system 114 may use image data acquired by the image sensors 106(3) during operation of the facility 1002. For example, the inventory management system 114 may identify items 1004, users 102, totes 1014, and so forth, based at least in part on their appearance within the image data acquired by the image sensors 106(3). The image sensors 106(3) may be mounted in various locations within the facility 1002. For example, image sensors 106(3) may be mounted overhead, on the fixtures 1108, may be worn or carried by users 102, may be affixed to totes 1014, and so forth.

One or more depth sensors 106(4) may also be included in the sensors 106. The depth sensors 106(4) are configured to acquire spatial or three-dimensional (3D) data, such as depth information, about objects within a field of view (FOV). The depth sensors 106(4) may include range cameras, lidar systems, sonar systems, radar systems, structured light systems, stereo vision systems, optical interferometry systems, and so forth. The inventory management system 114 may use the 3D data acquired by the depth sensors 106(4) to identify objects, determine a location of an object in 3D real space, and so forth.

One or more buttons 106(5) may be configured to accept input from the user 102. The buttons 106(5) may comprise mechanical, capacitive, optical, or other mechanisms. For example, the buttons 106(5) may comprise mechanical switches configured to accept an applied force from a touch of the user 102 to generate an input signal. The inventory management system 114 may use data from the buttons 106(5) to receive information from the user 102. For example, the tote 1014 may be configured with a button 106(5) to accept input from the user 102 and send information indicative of the input to the inventory management system 114.

One or more microphones 106(6) may be configured to acquire information indicative of sound present in the environment. In some implementations, arrays of microphones 106(6) may be used. These arrays may implement beamforming techniques to provide for directionality of gain. The inventory management system 114 may use the one or more microphones 106(6) to acquire information from acoustic tags 1104, accept voice input from the users 102, determine ambient noise level, and so forth.

The sensors 106 may include one or more optical sensors 106(7). The optical sensors 106(7) may be configured to provide data indicative of one or more of color or intensity of light impinging thereupon. For example, the optical sensor array 106(13) may comprise a photodiode and associated circuitry configured to generate a signal or data indicative of an incident flux of photons. As described below, the optical sensor array 106(13) may comprise a plurality of the optical sensors 106(7). For example, the optical sensor 106(7) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 106(7) may be used. The optical sensors 106(7) may be sensitive to one or more of infrared light, visible light, or ultraviolet light. For example, the optical sensors 106(7) may be sensitive to infrared light, and infrared light sources such as light emitting diodes (LEDs) may provide illumination.

The optical sensors 106(7) may include photodiodes, photoresistors, photovoltaic cells, quantum dot photoconductors, bolometers, pyroelectric infrared detectors, and so forth. For example, the optical sensor 106(7) may use germanium photodiodes to detect infrared light.

One or more radio frequency identification (RFID) readers 106(8), near field communication (NFC) systems, and so forth, may be included as sensors 106. For example, the RFID readers 106(8) may be configured to read the RF tags 1104. Information acquired by the RFID reader 106(8) may be used by the inventory management system 114 to identify an object associated with the RF tag 1104 such as the item 1004, the user 102, the tote 1014, and so forth. For example, based on information from the RFID readers 106(8) detecting the RF tag 1104 at different times and RFID readers 106(8) having different locations in the facility 1002, a velocity of the RF tag 1104 may be determined. NFC readers may be configured to operate at a particular frequency, such as 13.56 MHz. In comparison, RFID readers 106(8) may operate at various frequency ranges including 125-134 kHz, 13.56 MHz, or 856-960 MHz. Standards associated with the NFC reader and operation may be a subset of the standards associated with the RFID reader 106(8). NFC may also permit bidirectional communication between the devices, where RFID signals may be unidirectional.

One or more RF receivers 106(9) may also be included as sensors 106. In some implementations, the RF receivers 106(9) may be part of transceiver assemblies. The RF receivers 106(9) may be configured to acquire RF signals 1106 associated with Wi-Fi, Bluetooth, ZigBee, 4G, 3G, LTE, or other wireless data transmission technologies. The RF receivers 106(9) may provide information associated with data transmitted via radio frequencies, signal strength of RF signals 1106, and so forth. For example, information from the RF receivers 106(9) may be used by the inventory management system 114 to determine a location of an RF source, such as a communication interface onboard the tote 1014.

The sensors 106 may include one or more accelerometers 106(10), which may be worn or carried by the user 102, mounted to the tote 1014, and so forth. The accelerometers 106(10) may provide information such as the direction and magnitude of an imposed acceleration. Data such as rate of acceleration, determination of changes in direction, speed, and so forth, may be determined using the accelerometers 106(10).

A gyroscope 106(11) may provide information indicative of rotation of an object affixed thereto. For example, the tote 1014 or other objects may be equipped with a gyroscope 106(11) to provide data indicative of a change in orientation of the object.

A magnetometer 106(12) may be used to determine an orientation by measuring ambient magnetic fields, such as the terrestrial magnetic field. The magnetometer 106(12) may be worn or carried by the user 102, mounted to the tote 1014, and so forth. For example, the magnetometer 106(12) mounted to the tote 1014 may act as a compass and provide information indicative of which direction the tote 1014 is oriented.

An optical sensor array 106(13) may comprise one or more optical sensors 106(7). The optical sensors 106(7) may be arranged in a regular, repeating, or periodic two-dimensional arrangement such as a grid. The optical sensor array 106(13) may generate image data. For example, the optical sensor array 106(13) may be arranged within or below fixture 1108 and obtain information about shadows of items 1004, hand of the user 102, and so forth.

The sensors 106 may include proximity sensors 106(14) used to determine presence of an object, such as the user 102, the tote 1014, and so forth. The proximity sensors 106(14) may use optical, electrical, ultrasonic, electromagnetic, or other techniques to determine a presence of an object. In some implementations, the proximity sensors 106(14) may use an optical emitter and an optical detector to determine proximity. For example, an optical emitter may emit light, a portion of which may then be reflected by the object back to the optical detector to provide an indication that the object is proximate to the proximity sensor 106(14). In other implementations, the proximity sensors 106(14) may comprise a capacitive proximity sensor 106(14) configured to provide an electrical field and determine a change in electrical capacitance due to presence or absence of an object within the electrical field.

The proximity sensors 106(14) may be configured to provide sensor data indicative of one or more of a presence or absence of an object, a distance to the object, or characteristics of the object. An optical proximity sensor 106(14) may use time-of-flight (ToF), structured light, interferometry, or other techniques to generate distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 106 such as an image sensor 106(3). Based on an apparent distance between the features of the structured light pattern, the distance to the object may be calculated. Other techniques may also be used to determine distance to the object. In another example, the color of the reflected light may be used to characterize the object, such as skin, clothing, tote 1014, and so forth.

The sensors 106 may also include an instrumented auto-facing unit (IAFU) 106(15). The IAFU 106(15) may comprise a position sensor configured to provide data indicative of displacement of a pusher. As an item 1004 is removed from the IAFU 106(15), the pusher moves, such as under the influence of a spring, and pushes the remaining items 1004 in the IAFU 106(15) to the front of the fixture 1108. By using data from the position sensor, and given item data such as a depth of an individual item 1004, a count may be determined, based on a change in position data. For example, if each item 1004 is 1 inch deep, and the position data indicates a change of 17 inches, the quantity held by the IAFU 106(15) may have changed by 17 items 1004. This count information may be used to confirm or provide a cross check for a count obtained by other means, such as analysis of the weight data, the capacitance data, the image data, and so forth.

The sensors 106 may include other sensors 106(S) as well. For example, the other sensors 106(S) may include light curtains, ultrasonic rangefinders, thermometers, barometric sensors, air pressure sensors, hygrometers, and so forth. For example, the inventory management system 114 may use information acquired from thermometers and hygrometers in the facility 1002 to direct the user 102 to check on delicate items 1004 stored in a particular fixture 1108, which is overheating, too dry, too damp, and so forth.

In some implementations, the image sensor 106(3) or other sensors 106(S) may include hardware processors, memory, and other elements configured to perform various functions. For example, the image sensors 106(3) may be configured to generate image data, send the image data to another device such as the servers 112, and so forth.

The facility 1002 may include one or more access points 1110 configured to establish one or more wireless networks. The access points 1110 may use Wi-Fi, NFC, Bluetooth, or other technologies to establish wireless communications between a device and the network 1102. The wireless networks allow devices to communicate with one or more of the sensors 106, the inventory management system 114, the optical sensor arrays 106(13), the tag 1104, a communication device of the tote 1014, or other devices.

Output devices 218 may also be provided in the facility 1002. The output devices 218 are configured to generate signals, which may be perceived by the user 102 or detected by the sensors 106. In some implementations, the output devices 218 may be used to provide illumination of the optical sensor array 106(13).

Haptic output devices 218(1) are configured to provide a signal that results in a tactile sensation to the user 102. The haptic output devices 218(1) may use one or more mechanisms such as electrical stimulation or mechanical displacement to provide the signal. For example, the haptic output devices 218(1) may be configured to generate a modulated electrical signal, which produces an apparent tactile sensation in one or more fingers 302 of the user 102. In another example, the haptic output devices 218(1) may comprise piezoelectric or rotary motor devices configured to provide a vibration, which may be felt by the user 102.

One or more audio output devices 218(2) may be configured to provide acoustic output. The acoustic output includes one or more of infrasonic sound, audible sound, or ultrasonic sound. The audio output devices 218(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 312 may be configured to provide output, which may be seen by the user 102 or detected by a light-sensitive sensor such as an image sensor 106(3) or an optical sensor 106(7). In some implementations, the display devices 312 may be configured to produce output in one or more of infrared, visible, or ultraviolet light. The output may be monochrome or in color. The display devices 312 may be one or more of emissive, reflective, microelectromechanical, and so forth. An emissive display device 312, such as using LEDs, is configured to emit light during operation. In comparison, a reflective display device 312, such as using an electrophoretic element, relies on ambient light to present an image. Backlights or front lights may be used to illuminate non-emissive display devices 312 to provide visibility of the output in conditions where the ambient light levels are low.

The display devices 312 may be located at various points within the facility 1002. For example, the addressable display devices 312 may be located on the fixtures 1108, totes 1014, on the floor of the facility 1002, and so forth.

Other output devices 218(P) may also be present. For example, the other output devices 218(P) may include scent/odor dispensers, document printers, 3D printers or fabrication equipment, and so forth.

Figure 12:
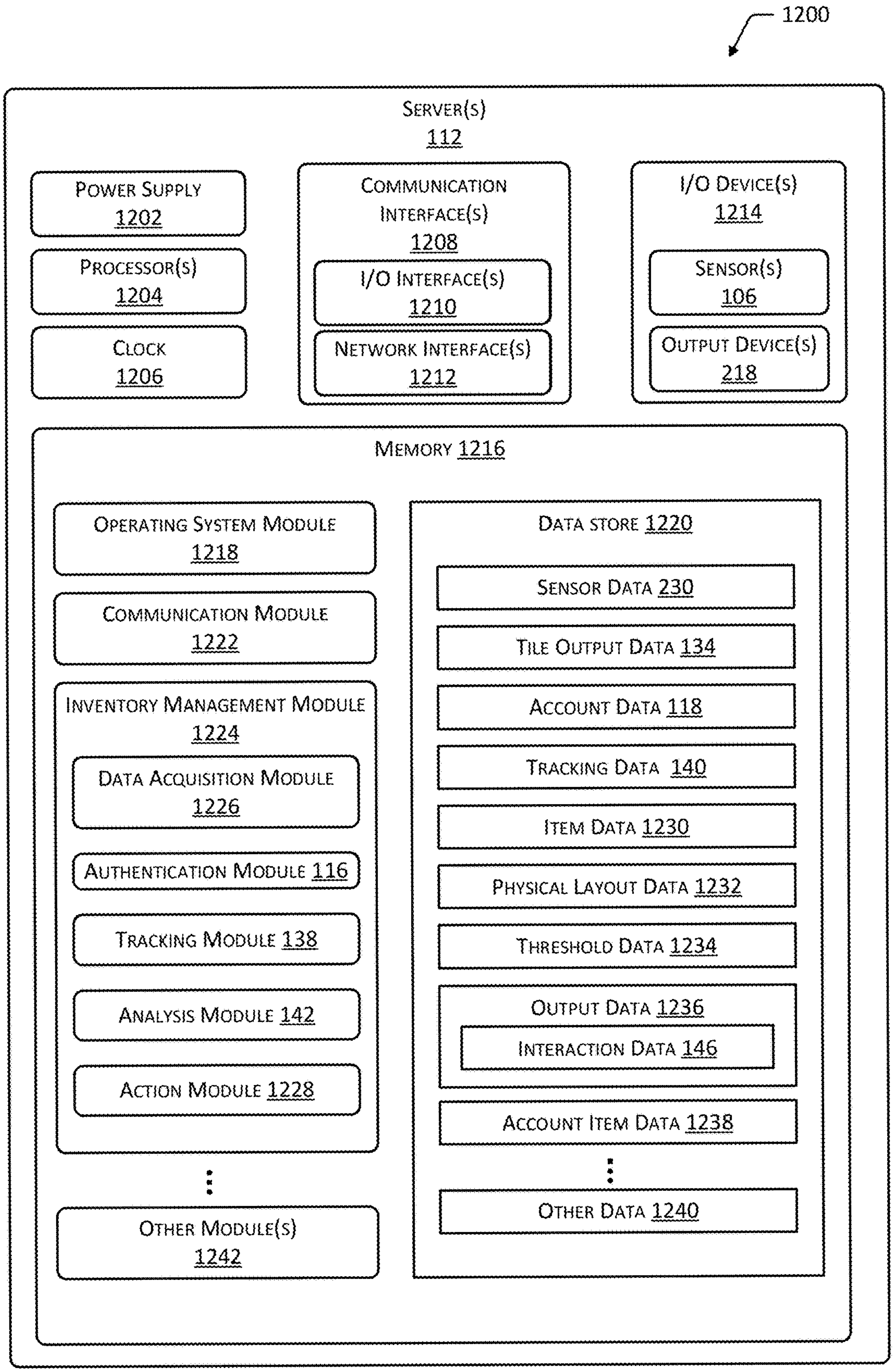
FIG. 12 is a block diagram of a server to support operation of the facility, according to some implementations.

FIG. 12 illustrates a block diagram 1200 of a server 112 configured to support operation of the facility 1002, according to some implementations. The servers 112 may be physically present at the facility 1002, may be accessible by the network 1102, or a combination of both. The server 112 does not require end-user knowledge of the physical location and configuration of the system that delivers the services. Common expressions associated with the servers 112 may include "on-demand computing", "software as a service (SaaS)", "platform computing", "network-accessible platform", "cloud services", "data centers", and so forth. Services provided by the servers 112 may be distributed across one or more physical or virtual devices.

One or more power supplies 1202 may be configured to provide electrical power suitable for operating the components in the servers 112. The one or more power supplies 1202 may comprise batteries, capacitors, fuel cells, photovoltaic cells, wireless power receivers, conductive couplings suitable for attachment to an external power source such as provided by an electric utility, and so forth. The servers 112 may include one or more hardware processors 1204 (processors) configured to execute one or more stored instructions. The processors 1204 may comprise one or more cores. One or more clocks 1206 may provide information indicative of date, time, ticks, and so forth. For example, the processor 1204 may use data from the clock 1206 to associate a particular interaction with a particular point in time.

The servers 112 may include one or more communication interfaces 1208 such as input/output (I/O) interfaces 1210, network interfaces 1212, and so forth. The communication interfaces 1208 enable the servers 112, or components thereof, to communicate with other devices or components. The communication interfaces 1208 may include one or more I/O interfaces 1210. The I/O interfaces 1210 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1210 may couple to one or more I/O devices 1214. The I/O devices 1214 may include input devices such as one or more of a sensor 106, keyboard, mouse, scanner, and so forth. The I/O devices 1214 may also include output devices 218 such as one or more of a display device 312, printer, audio speakers, and so forth. In some embodiments, the I/O devices 1214 may be physically incorporated with the servers 112 or may be externally placed.

The network interfaces 1212 may be configured to provide communications between the servers 112 and other devices, such as the SFTs 128, totes 1014, routers, access points 1110, and so forth. The network interfaces 1212 may include devices configured to couple to personal area networks (PANs), local area networks (LANs), wireless local area networks (WLANS), wide area networks (WANs), and so forth. For example, the network interfaces 1212 may include devices compatible with Ethernet, Wi-Fi, Bluetooth, ZigBee, and so forth.

The servers 112 may also include one or more busses or other internal communications hardware or software that allow for the transfer of data between the various modules and components of the servers 112.

As shown in FIG. 12, the servers 112 includes one or more memories 1216. The memory 1216 may comprise one or more non-transitory CRSM. The memory 1216 provides storage of computer-readable instructions, data structures, program modules, and other data for the operation of the servers 112. A few example functional modules are shown stored in the memory 1216, although the same functionality may alternatively be implemented in hardware, firmware, or as a system on a chip (SoC).

The memory 1216 may include at least one operating system (OS) module 1218. The OS module 1218 is configured to manage hardware resource devices such as the I/O interfaces 1210, the I/O devices 1214, the communication interfaces 1208, and provide various services to applications or modules executing on the processors 1204. The OS module 1218 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1216 may be a data store 1220 and one or more of the following modules. These modules may be executed as foreground applications, background tasks, daemons, and so forth. The data store 1220 may use a flat file, database, linked list, tree, executable code, script, or other data structure to store information. In some implementations, the data store 1220 or a portion of the data store 1220 may be distributed across one or more other devices including the servers 112, network attached storage devices, and so forth.

A communication module 1222 may be configured to establish communications with one or more of the totes 1014, sensors 106, display devices 312, other servers 112, or other devices. The communications may be authenticated, encrypted, and so forth.

The memory 1216 may store an inventory management module 1224. The inventory management module 1224 is configured to provide the inventory functions as described herein with regard to the inventory management system 114. For example, the inventory management module 1224 may track items 1004 between different fixtures 1108, to and from the totes 1014, and so forth.

The inventory management module 1224 may include one or more of a data acquisition module 1226, a tracking module 138, an analysis module 142, an action module 1228, and so forth. The data acquisition module 1226 may be configured to acquire and access information associated with operation of the facility 1002. For example, the data acquisition module 1226 may be configured to acquire tile output data 134 from the SFTs 128, fixture data, sensor data 230 such as the time series data 316, weight data, capacitance data, image data, and so forth. The sensor data 230 may be accessed by the other modules for use.

The data store 1220 may also store item data 1230. The item data 1230 provides information about a particular type of item 1004, including characteristics of that type of item 1004 such as physical dimensions, where that type of item 1004 is located in the facility 1002, characteristics about how the item 1004 appears, capacitance values associated with the type of item 1004, attenuation characteristics of an EMS 122, and so forth. For example, the item data 1230 may indicate that the type of item 1004 is "Bob's Low Fat Baked Beans, 10 oz can" with a stock keeping unit number of "24076513". The item data 1230 may indicate the types and quantities of items 1004 that are expected to be stored at that particular fixture 1108 such as in a particular lane on a shelf, width and depth of that type of item 1004, weight of the item 1004 individually or in aggregate, sample images of the type of item 1004, and so forth.

The item data 1230 may include an item identifier. The item identifier may be used to distinguish one type of item 1004 from another. For example, the item identifier may include a stock keeping unit (SKU) string, Universal Product Code (UPC) number, radio frequency identification (RFID) tag data, and so forth. The items 1004 that are of the same type may be referred to by the same item identifier. For example, cans of beef flavor Brand X dog food may be represented by the item identifier value of "9811901181". In other implementations, non-fungible items 1004 may each be provided with a unique item identifier, allowing each to be distinguished from one another.

The item data 1230 may include one or more of geometry data, item weight data, sample image data, sample capacitance data, or other data. The geometry data may include information indicative of size and shape of the item 1004 in one-, two-, or three-dimensions. For example, the geometry data may include the overall shape of an item 1004, such as a cuboid, sphere, cylinder, and so forth. The geometry data may also include information such as length, width, depth, and so forth, of the item 1004. Dimensional information in the geometry data may be measured in pixels, centimeters, inches, arbitrary units, and so forth. The geometry data may be for a single item 1004, or a package, kit, or other grouping considered to be a single item 1004.

The item weight data comprises information indicative of a weight of a single item 1004, or a package, kit, or another grouping considered to be a single item 1004. The item data 1230 may include other data. For example, the other data may comprise weight distribution of the item 1004, point cloud data for the item 1004, and so forth.

The sample capacitance data may comprise data indicative of a previously measured or calculated change in capacitance obtained by a representative capacitive sensor 106 based on the presence or absence of a sample of the type of item 1004. For example, during processing or intake of the item 1004 at the facility 1002, a sample of the type of item 1004 may be placed on a capacitive sensor 106 to generate the sample capacitance data. Similar data may be obtained for the attenuation or propagation of the EMS 122 across the item 1004.

The sample image data may comprise one or more images of one or more of that type of item 1004. For example, sample image data may be obtained during processing or intake of the item 1004 to be used by the facility 1002.

The item data 1230 may include one or more fixture identifiers (IDs). The fixture ID is indicative of a particular area or volume of fixture 1108 such as a shelf that is designated for stowage of the type of item 1004. For example, a single shelf may have several lanes, each with a different fixture ID. Each of the different fixture IDs may be associated with a lane having a particular area on the shelf designated for storage of a particular type of item 1004. A single type of item 1004 may be associated with a particular fixture ID, a plurality of fixture IDs may be associated with the single type of item 1004, more than one type of item 1004 may be associated with the particular fixture ID, and so forth.

The item data 1230 may also include quantity data. The quantity data may comprise a count or value indicative of a number of items 1004. The count may be a measured or an estimated value. The quantity data may be associated with a particular fixture ID, for an entire facility 1002, and so forth. For example, the same type of item 1004 may be stored at different shelves within the facility 1002. The quantity data may indicate the quantity on hand for each of the different fixtures 1108.

The tracking module 138 may access physical layout data 1232 and generate tracking data 140. The tracking module 138 may be configured to determine a location within the facility 1002 of the user 102 who is associated with a particular user account as specified in the account data 118 as determined by the authentication module 116. For example, the tracking module 138 may determine that an item 1004 has been removed from a lane and placed into the tote 1014 based on the fixture data indicative of the user's 102 characteristic data 136 having been received at the lane. The tracking module 138 may then determine that the tote 1014 is associated with the account data 118 indicated by the authentication module 116 that is representative of the user 102. Based on this information, the analysis module 142 may generate the interaction data 146.

The analysis module 142 may utilize the tile output data 134, information from the authentication module 116, fixture data, weight data, capacitance data, item data 1230, and other information to generate interaction data 146. The interaction data 146 is indicative of action such as picking or placing an item 1002 for a particular fixture 1108, presence of the user 102 at the fixture 1108, and so forth.

The inventory management module 1224, and modules associated therewith, may access sensor data 230, threshold data 1234, and so forth. The threshold data 1234 may comprise one or more thresholds, ranges, percentages, and so forth, that may be used by the various modules in operation.

In some implementations, the analysis module 142 may generate output data 1236. For example, the output data 1236 may include the interaction data 146, inventory levels for individual types of items 1002, overall inventory, and so forth. The analysis module 142 may determine if the user 102 is standing, moving, lying on the floor, and so forth. For example, the analysis module 142 may determine an area of contact with the floor based on the tile output data 134. If the area of contact exceeds a threshold value, the user 102 may be determined to be lying on the floor. Based on this determination, other actions may be taken. For example, alarm data may be generated to summon assistance if a user 102 is deemed to be lying on the floor.

The inventory management module 1224 may utilize the physical layout data 1232. The physical layout data 1232 may provide information indicative of location of the SFTs 128, where sensors 106 and the fixtures 1108 are in the facility 1002 with respect to one another, FOV of sensors 106 relative to the fixture 1108, and so forth. For example, the physical layout data 1232 may comprise information representative of a map or floor plan of the facility 1102 with relative positions of the fixtures 1108, location of individual SFTs 128 therein, arrangements of the segments, planogram data indicative of how items 1004 are to be arranged at the fixtures 1108, and so forth. Continuing the example, the physical layout data 1232 may be based on using the relative arrangement of the SFTs 128 in conjunction with their physical dimensions to specify where the SFTs 128 are placed within the facility 1002.

The physical layout data 1232 may associate a particular fixture ID with other information such as physical location data, sensor position data, sensor direction data, sensor identifiers, and so forth. The physical layout data 1232 provides information about where in the facility 1002 objects are, such as the fixtures 1108, the sensors 106, and so forth. In some implementations, the physical location data 1232 may be relative to another object. For example, the physical location data 1232 may indicate that a particular weight sensor 106(2), capacitive sensor 106, or image sensor 106(3) is associated with the shelf or portion thereof.

The inventory management module 1224 may utilize the physical layout data 1232 and other information during operation. For example, the tracking module 138 may utilize physical layout data 1232 to determine what capacitance data acquired from particular capacitive sensors 106 corresponds to a particular shelf, lane, or other fixture 1108.

The tracking module 138 may access information from sensors 106 within the facility 1002, such as those at the shelf or other fixtures 1108, onboard the tote 1014, carried by or worn by the user 102, and so forth. For example, the tracking module 138 may receive the fixture data and use the characteristic data 136 to associate a particular user 102 with a pick or place of an item 1004 at the associated fixture 1108.

The account item data 1238 may also be included in the data store 1220 and comprises information indicative of one or more items 1004 that are within the custody of a particular user 102, within a particular tote 1014, and so forth. For example, the account item data 1238 may comprise a list of the contents of the tote 1014. Continuing the example, the list may be further associated with the user account determined by the authentication module 116 that is representative of the user 102. In another example, the account item data 1238 may comprise a list of items 1004 that the user 102 is carrying. The tracking module 138 may use the account item data 1238 to determine subsets of possible items 1004 with which the user 102 may have interacted.

The action module 1228 may be configured to initiate or coordinate one or more actions responsive to output data 1236. For example, the action module 1228 may access output data 1236 that indicates a particular fixture 1108 is empty and in need of restocking. An action such as a dispatch of a work order or transmitting instructions to a robot may be performed to facilitate restocking of the fixture 1108.

Processing sensor data 230, such as the image data, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 230. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 230 or other data. For example, the ANN may be a trained using a supervised learning algorithm such that object identifiers are associated with images of particular objects within training images provided to the ANN. Once trained, the ANN may be provided with the sensor data 230 and the item data 1230 to allow for a determination of similarity between two or more images.

The sensor data 230 obtained from different sensors 106 may be used to compare or validate output data 1236. For example, the image data may indicate the presence of a person based on a coat or jacket that is arranged across the back of a chair. However, the tile output data 134 provides information that no user 102 is currently present at that location in the facility 1002. This difference may be used to generate an alarm, notify an associate in the facility 1002, and so forth.

Other data 1240 may be stored in the data store 1220 as well as other modules 1242 in the memory 1216. For example, the other modules 1242 may include a billing module while the other data 1240 may include billing data.

The system described above may be utilized in a variety of different settings including, but not limited to, commercial, non-commercial, medical, and so forth. For example, the portable device 104 and the SFTs 128 may be deployed in a home, hospital, care facility, correctional facility, transportation facility, office, and so forth. The authentication module 116 may be used to identify particular users 102. The tracking module 138 may provide tracking data 140, such as the location of these identified users 102 within a facility. The analysis module 142 may be used to generate output data 1236 that is indicative of a status of the user 102, such as whether the user 102 is standing, sitting, lying on the floor, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

a portable device comprising:
- a display device;
- a touch sensor comprising:
  - electrodes configured to capacitively couple to a first portion of a user, and
  - capacitive sensor circuitry configured to apply a voltage to particular electrodes at particular times;
- a first memory storing first computer-executable instructions; and
- a first hardware processor to execute the first computer-executable instructions to:
  - access authentication data; and
  - control the capacitive sensor circuitry to generate a first signal at a first frequency that is propagated by a body of the user from the first portion of the user coupled to the electrodes to a second portion of the user coupled to a smart floor tile, wherein the first signal conveys the authentication data, and wherein the first signal is generated by changing from a first time to a second time the voltage applied to the particular electrodes; and the smart floor tile comprising:
- a receiver connected to a first antenna;
- a transmitter to generate a second signal;
- a second antenna coupled to the transmitter to radiate the second signal;
- a communication interface;
- a second memory storing second computer-executable instructions; and
- a second hardware processor to execute the second computer-executable instructions to:
  - receive the first signal using the receiver;
  - analyze the first signal to determine the authentication data; and
  - send the authentication data using the communication interface.

2. The system of claim 1, the smart floor tile further comprising:

the second memory storing third computer-executable instructions; and
the second hardware processor to further execute the third computer-executable instructions to:
configure the transmitter to modulate the second signal to convey data; and
the portable device further comprising:
the first memory storing fourth computer-executable instructions; and
the first hardware processor to further execute the fourth computer-executable instructions to:
determine time series data indicative of a time series of changes in capacitance as measured at one or more of the electrodes, wherein the changes are responsive to the second signal; and
determine the data based on the time series data.

3. The system of claim 1, the touch sensor further comprising an oscillator to generate the voltage as an alternating current with the first frequency of between 10 kilohertz and 15 megahertz.

4. A system comprising:
a portable device comprising:
a touch sensor comprising:
electrodes configured to capacitively couple to a first portion of a user; and
touch sensor circuitry configured to control application of a voltage to one or more of the electrodes;
a first memory storing first computer-executable instructions; and
a first hardware processor to execute the first computer-executable instructions to:
access authentication data; and
operate, at a first time, the touch sensor circuitry to generate a first signal with the one or more of the electrodes at a first frequency that is propagated by a body of the user from the first portion of the user coupled to the electrodes to a second portion of the user coupled to a smart floor tile, wherein the first signal conveys the authentication data; and
the smart floor tile comprising:
a receiver connected to an antenna;
a transmitter to generate a second signal;
the antenna coupled to the transmitter, the antenna configured to radiate the second signal;
a second memory storing second computer-executable instructions; and
a second hardware processor to execute the second computer-executable instructions to:
receive the first signal using the receiver; and
analyze the first signal to determine the authentication data.

5. The system of claim 4, the first memory storing third computer- executable instructions; and
the first hardware processor to further execute the third computer-executable instructions to:
receive user input data using the touch sensor; and
generate the authentication data based on the user input data.

6. The system of claim 4, the portable device further comprising:
one or more sensors;
the first memory storing third computer-executable instructions; and
the first hardware processor to further execute the third computer-executable instructions to:
acquire, using the one or more sensors, biometric data associated with the user; and
generate the authentication data based at least in part on the biometric data.

7. The system of claim 6, the one or more sensors comprising one or more of:
a fingerprint scanner,
a palmprint scanner,
a camera,
a radio frequency identification (RFID) tag reader,
a near field communication (NFC) tag reader, or
a microphone.

8. The system of claim 4, further comprising the first memory storing third computer-executable instructions; and
the first hardware processor to further execute the third computer-executable instructions to:
operate, at a second time, the touch sensor circuitry to determine time series data indicative of a time series of changes in one or more electrical characteristics at the one or more of the electrodes; and
analyze the time series data to generate data.

9. The system of claim 8, wherein the one or more electrical characteristics comprise one or more of electrical resistance, electrical capacitance, frequency, or phase.

10. The system of claim 4, the portable device further comprising one or more of:
a smart phone,
a wearable computing device, or
a tablet computer.

11. The system of claim 4, the smart floor tile further comprising:
a communication interface; and
the second hardware processor to further execute the second computer-executable instructions to:
send the authentication data using the communication interface.

12. The system of claim 11, the smart floor tile further comprising:
the second memory storing third computer-executable instructions; and
the second hardware processor to further execute the third computer-executable instructions to:
configure the transmitter to modulate the second signal to convey data; and
the portable device further comprising:
the first memory storing fourth computer-executable instructions; and
the first hardware processor to further execute the fourth computer-executable instructions to:
determine sensor data indicative of one or more changes in one or more electrical characteristics measured at the one or more of the electrodes in the touch sensor, wherein at least a portion of the one or more changes are responsive to the second signal;
and determine the data based on the sensor data.

13. The system of claim 11, wherein the first frequency operates at less than 15 megahertz.

14. The system of claim 4, the touch sensor further comprising one or more of:
electrically capacitive junctions formed by two or more of the electrodes, or
electrically resistive junctions formed by the two or more of the electrodes.

15. A system comprising:
a portable device comprising:
a first device comprising a display device, the first device configurable to generate a signal and couple at least a portion of the signal to a first portion of a user;

a first memory storing first computer-executable instructions; and a first hardware processor to execute the first computer-executable instructions to:

access authentication data; and operate the first device to generate a first signal at a first frequency that is propagated by a body of the user from the first portion of the user coupled to the first device to a second portion of the user coupled to a smart floor tile, wherein the first signal conveys the authentication data; and the smart floor tile comprising:

a receiver;

a second memory storing second computer-executable instructions; and a second hardware processor to execute the second computer-executable instructions to:

receive the first signal using the receiver; and determine the authentication data.

16. The system of claim 15, wherein the display device is operated to change a voltage applied to one or more junctions therein to generate the first signal.

17. The system of claim 15, wherein the first device further comprises a touch sensor, and further wherein the touch sensor is operated to change a voltage applied to one or more electrodes in the touch sensor to generate the first signal.

18. The system of claim 15, wherein the first device further comprises a touch sensor;

the first memory storing third computer-executable instructions; and the first hardware processor to further execute the third computer-executable instructions to:

operate the touch sensor to determine time series data indicative of a time series of changes in one or more electrical characteristics at one or more electrodes in the touch sensor; and determine second data based on the time series data.

19. The system of claim 15, wherein the first device further comprises a transmitter and an antenna coupled to the transmitter, and further wherein the transmitter is configured to generate the first signal having a carrier frequency of between 20 kilohertz and 15 megahertz.

20. The system of claim 15, the portable device further comprising one or more sensors, the one or more sensors comprising one or more of:

a fingerprint scanner, a palmprint scanner, a camera, a radio frequency identification (RFID) tag reader, a near field communication (NFC) tag reader, or a microphone;

the first memory storing third computer-executable instructions; and the first hardware processor to further execute the third computer-executable instructions to:

acquire, using the one or more sensors, biometric data associated with the user; and generate the authentication data based at least in part on the biometric data.

21. A system comprising:

a portable device comprising:

one or more sensors;

a device;

a first memory storing first computer-executable instructions; and a first hardware processor to execute the first computer-executable instructions to:

acquire, using the one or more sensors, data associated with a user;

determine authentication data for the user based at least in part on the data associated with the user;

operate the device to generate a signal, wherein the signal conveys the authentication data for the user;

couple the signal to the user; and propagate the signal to a smart floor tile via a path that incorporates the user; and the smart floor tile comprising:

a second memory storing second computer-executable instructions; and a second hardware processor to execute the second computer-executable instructions to:

receive the signal; and determine the authentication data for the user.

* * * * *